(12) United States Patent
Mimura et al.

(10) Patent No.: US 10,228,698 B2
(45) Date of Patent: Mar. 12, 2019

(54) VEHICLE CONTROL SYSTEM, VEHICLE CONTROL METHOD, AND VEHICLE CONTROL PROGRAM

(71) Applicant: Honda Motor Co., Ltd., Tokyo (JP)

(72) Inventors: Yoshitaka Mimura, Saitama (JP); Kohei Okimoto, Saitama (JP); Naotaka Kumakiri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/584,029

(22) Filed: May 2, 2017

(65) Prior Publication Data

US 2017/0315556 A1 Nov. 2, 2017

(30) Foreign Application Priority Data

May 2, 2016 (JP) ................................ 2016-092513

(51) Int. Cl.
*G05D 1/00* (2006.01)
*G08G 1/16* (2006.01)
(Continued)

(52) U.S. Cl.
CPC ......... *G05D 1/0223* (2013.01); *B60W 40/072* (2013.01); *B60W 40/09* (2013.01); *G05D 1/0061* (2013.01); *G08G 1/09626* (2013.01); *G08G 1/096725* (2013.01); *G08G 1/167* (2013.01); *B60R 16/0231* (2013.01);
(Continued)

(58) Field of Classification Search
CPC ........ G05D 1/00; B60W 40/00; B60W 40/06; B60W 40/072; G08G 1/00; G08G 1/09626
See application file for complete search history.

(56) References Cited

U.S. PATENT DOCUMENTS 9,168,924 B2\* 10/2015 Lee ...................... B60W 50/04
9,290,174 B1\* 3/2016 Zagorski ................ B60K 28/06
(Continued)

FOREIGN PATENT DOCUMENTS

JP 09-159482 6/1997
JP 2008-224549 9/2008
(Continued)

OTHER PUBLICATIONS

"Office Action of Japan Counterpart Application," dated Mar. 6, 2018, with English translation thereof, p. 1-p. 15, in which the listed references were cited.

*Primary Examiner* — Yonel Beaulieu
(74) *Attorney, Agent, or Firm* — JCIPRNET

(57) ABSTRACT

One object is to enable a preparation period for switching between modes in automated driving to be provided for a vehicle occupant. A vehicle control system includes an automated driving control unit that automatically controls at least one of acceleration/deceleration and steering of a host vehicle, the automated driving control unit performing automated driving control in any one of a plurality of modes having different degrees of automated driving, a detection unit that detects a state of an occupant in the host vehicle, an output unit that outputs notification information on the automated driving control, and a notification condition changing unit that changes a notification condition for outputting the notification information according to the state of the occupant detected by the detection unit.

14 Claims, 12 Drawing Sheets

(51) Int. Cl.
  *B60W 40/09* (2012.01)
  *G08B 21/06* (2006.01)
  *G05D 1/02* (2006.01)
  *B60W 40/072* (2012.01)
  *G08G 1/0962* (2006.01)
  *G08G 1/0967* (2006.01)
  *B60R 16/023* (2006.01)

(52) U.S. Cl.
  CPC ............ *B60R 2300/8006* (2013.01); *G05D 2201/0213* (2013.01); *G08B 21/06* (2013.01)

(56) References Cited

U.S. PATENT DOCUMENTS

| | | | |
|---|---|---|---|
| 2002/0022927 A1* | 2/2002 | Lemelson | G01S 19/11 |
| | | | 701/301 |
| 2014/0244096 A1* | 8/2014 | An | G05D 1/0055 |
| | | | 701/25 |
| 2017/0267241 A1* | 9/2017 | Matsunaga | B60W 10/04 |
| 2017/0313324 A1* | 11/2017 | Kumai | B60W 40/02 |
| 2017/0355377 A1* | 12/2017 | Vijaya Kumar | B60W 40/08 |
| 2018/0005526 A1* | 1/2018 | Sendhoff | G08G 1/0967 |
| 2018/0096605 A1* | 4/2018 | Bai | B60K 35/00 |
| 2018/0099666 A1* | 4/2018 | Abe | B60W 30/12 |
| 2018/0099667 A1* | 4/2018 | Abe | B60W 30/12 |
| 2018/0111628 A1* | 4/2018 | Tamagaki | B60W 50/12 |
| 2018/0136652 A1* | 5/2018 | Jiang | G05D 1/0088 |

FOREIGN PATENT DOCUMENTS

| | | |
|---|---|---|
| JP | 2015-032054 | 2/2015 |
| JP | 2015-092237 | 5/2015 |
| JP | 2015514034 | 5/2015 |
| JP | 2015182624 | 10/2015 |
| JP | 2015-217798 | 12/2015 |
| JP | 2016-038768 | 3/2016 |

* cited by examiner

RULE INFORMATION

| STATE OF INSIDE OF VEHICLE | DIVERGENCE DEGREE | NOTIFICATION TIMING | OUTPUT DEVICE AND METHOD |
|---|---|---|---|
| STATE IN WHICH VEHICLE OCCUPANT IS AWAKE AND DIRECTED TO TRAVELING DIRECTION AND CAN PERFORM DRIVING OPERATION | NO DIVERGENCE | N0 SECONDS BEFORE | DISPLAY ON DISPLAY DEVICE 82 |
| VEHICLE OCCUPANT IS AWAKE AND DIRECTED TO TRAVELING DIRECTION AND HAD TOUCHED PEDAL, BUT RELEASED HANDS FROM STEERING WHEEL | DIVERGENCE LEVEL 1 | N1 SECONDS BEFORE | DISPLAY ON DISPLAY DEVICE 82 → SOUND OUTPUT FROM SPEAKER 83 |
| VEHICLE OCCUPANT IS AWAKE AND DIRECTED TO TRAVELING DIRECTION, BUT DOES NOT TOUCH STEERING WHEEL AND PEDAL | DIVERGENCE LEVEL 2 | N2 SECONDS BEFORE | DISPLAY ON DISPLAY DEVICE 82 → SOUND OUTPUT FROM SPEAKER 83 |
| VEHICLE OCCUPANT IS AWAKE AND IS DIRECTED IN DIRECTION OTHER THAN TRAVELING DIRECTION AND DOES NOT TOUCH STEERING WHEEL AND PEDALS | DIVERGENCE LEVEL 3 | N3 SECONDS BEFORE | SOUND OUTPUT FROM SPEAKER 83 → VIBRATION OF SEAT DRIVING DEVICE 89 |
| VEHICLE OCCUPANT TURNS OVER SEAT AND FALLEN ASLEEP | DIVERGENCE LEVEL 4 | N4 SECONDS BEFORE | SOUND OUTPUT FROM SPEAKER 83 →VIBRATION OF SEAT DRIVING DEVICE 89 → COLD AIR FROM AIR-CONDITIONING DEVICE →OPEN WINDOW IN WINDOW DRIVING DEVICE 91 |
| ... | ... | ... | ... |

FIG. 13

VEHICLE CONTROL SYSTEM, VEHICLE CONTROL METHOD, AND VEHICLE CONTROL PROGRAM

CROSS-REFERENCE TO RELATED APPLICATION

This application claims the priority benefit of Japan application serial no. 2016-092513, filed on May 2, 2016. The entirety of the above-mentioned patent application is hereby incorporated by reference herein and made a part of this specification.

BACKGROUND OF THE INVENTION

Field of the Invention

The present invention relates to a vehicle control system, a vehicle control method, and a vehicle control program.

Description of Related Art

In recent years, research on a technology (hereinafter referred to as "automated driving") for automatically controlling at least one of acceleration/deceleration and steering of a host vehicle so that the host vehicle travels along a route to a destination has been performed. In connection with this, an information display device including a display control means that determines an automated driving level on the basis of a system state of an automated driven vehicle and simultaneously displays an image of an operation unit of a vehicle and an image of a portion of a person that operates an operation unit on a display means according to the automated driving level is known (see, for example, Japanese Unexamined Patent Publication No. 2015-182624).

SUMMARY OF THE INVENTION

However, in the related art, switching to each mode in automated driving is automatically performed at a timing at which a preset switching condition is satisfied, and a situation in which a vehicle occupant is not ready is likely to occur.

The present invention has been made in view of the above circumstances, and an object thereof is to provide a vehicle control system, a vehicle control method, and a vehicle control program capable of providing a preparation period for switching between modes in automated driving for a vehicle occupant.

The invention according to a first aspect is a vehicle control system (100), including: an automated driving control unit (120) that automatically controls at least one of acceleration/deceleration and steering of a host vehicle, the automated driving control unit performing automated driving control in any one of a plurality of modes having different degrees of automated driving; a detection unit (for example, a detection device DD, an in-vehicle camera 95, an in-vehicle camera 95A, a load sensor 88B, and a load sensor 88C) that detects a state of an occupant in the host vehicle; an output unit (for example, a navigation device 50, a display device 82, a speaker 83, a vibration device 88D, a window driving device 91, a blowing-out port 97 of an air-conditioning device) that outputs notification information on the automated driving control; and a notification condition changing unit (174) that changes a notification condition for outputting the notification information according to the state of the occupant detected by the detection unit.

According to the invention defined in a second aspect, in the vehicle control system according to the first aspect, the notification information is notification information according to a transition of a degree of automated driving.

According to the invention defined in a third aspect, in the vehicle control system according to the first or second aspect, the notification condition changing unit changes a timing at which the notification information is output.

According to the invention defined in a fourth aspect, in the vehicle control system according to the third aspect, the notification condition changing unit changes the timing on the basis of a degree of divergence between the state of the occupant detected by the detection unit and the state of the occupant according to the degree by which automated driving is to transition.

According to the invention defined in a fifth aspect, in the vehicle control system according to the fourth aspect, the notification condition changing unit changes the timing to output the notification information before a reference timing when the degree of divergence is greater than a predetermined value, and changes the timing to output the notification information after the reference timing when the degree of divergence is smaller than the predetermined value.

According to the invention defined in a sixth aspect, in the vehicle control system according to the first or second aspect, the output unit includes a plurality of different output devices, and the notification condition changing unit changes an output device that outputs the notification information according to a state of an occupant detected by the detection unit.

According to the invention defined in a seventh aspect, in the vehicle control system according to the sixth aspect, the notification condition changing unit selects a display device as an output target device when the state is determined to be a state in which the occupant is able to view display content of the display device among the plurality of output devices, and selects an output device other than the display device as the output target device when the state is determined not to be a state in which the occupant is able to view the display content.

According to the invention defined in an eighth aspect, in the vehicle control system according to the sixth aspect, the notification condition changing unit changes the output device that outputs the notification information on the basis of the state of the occupant detected by the detection unit, which is obtained after the notification information is output from the output device.

The invention according to a ninth aspect is a vehicle control method, including: performing, by a vehicle-mounted computer, automated driving control of automatically controlling at least one of acceleration/deceleration and steering of a host vehicle, the automated driving control being performed in any one of a plurality of modes having different degrees of automated driving; detecting, by a vehicle-mounted computer, a state of an occupant in the host vehicle; and changing, by a vehicle-mounted computer, a notification condition for outputting notification information on the automated driving control according to the detected state of the occupant, and outputting the notification information.

The invention according to a tenth aspect is a vehicle control program, causing a vehicle-mounted computer to execute: performing automated driving control of automatically controlling, at least one of acceleration/deceleration and steering of a host vehicle, the automated driving control being performed in any one of a plurality of modes having different degrees of automated driving; detecting a state of an occupant in the host vehicle; and changing a notification condition for outputting notification information on the automated driving control according to the detected state of the occupant, and outputting the notification information using an output device.

According to the invention defined in the first, ninth, and tenth aspects, it is possible to notify the notification information on the automated driving control to the occupant in the notification condition according to the state of the occupant. Accordingly, it is possible to provide a period during which preparation corresponding to the state of the automated driving control is performed for the occupant.

According to the invention defined in the second aspect, it is possible to provide the preparation period in which it is possible to cope with a transition of the degree of automated driving, for the occupant.

According to the invention defined in the third aspect, it is possible to output the notification information at a timing according to the state of the occupant.

According to the invention defined in the fourth aspect, it is possible to output the notification information at a timing according to the degree of divergence between the state of the occupant and the state of the occupant according to the degree by which automated driving is to transition.

According to the invention defined in the fifth aspect, since the notification information can be output at a timing before the reference timing when the degree of divergence between the state of the occupant and the state of the occupant according to the degree by which automated driving is to transition is larger, it is possible to output the notification information at a timing according to the state of the occupant even when the state of the occupant is a state in which preparation will take time. Further, since the notification information can be output at a timing after the reference timing when the degree of divergence between the state of the occupant and the state of the occupant according to the degree by which automated driving is to transition is smaller, it is possible to prevent the notification information from being output at an unnecessarily early timing.

According to the invention defined in the sixth aspect, it is possible to appropriately select an output device according to the state of the occupant from a plurality of output devices that output the notification information, and to notify the notification information.

According to the invention defined in the seventh aspect, it is possible to output the notification information from the display device or an output device other than the display device according to whether or not the vehicle occupant is able to view display content of the display device. Thus, it is possible to improve a likelihood of the vehicle occupant being able to recognize the notification information.

According to the invention defined in the eighth aspect, even when there is a change in the state of the occupant according to the output of the notification information, it is possible to change the output device that outputs the notification information according to the state of the occupant after the notification information is output.

BRIEF DESCRIPTION OF THE DRAWINGS

FIG. 13 is a diagram illustrating an example of rule information.

DETAILED DESCRIPTION OF THE INVENTION

Hereinafter, embodiments of a vehicle control system, a vehicle control method, and a vehicle control program of the present invention will be described with reference to the drawings.

<Common Configuration>

Figure 1:
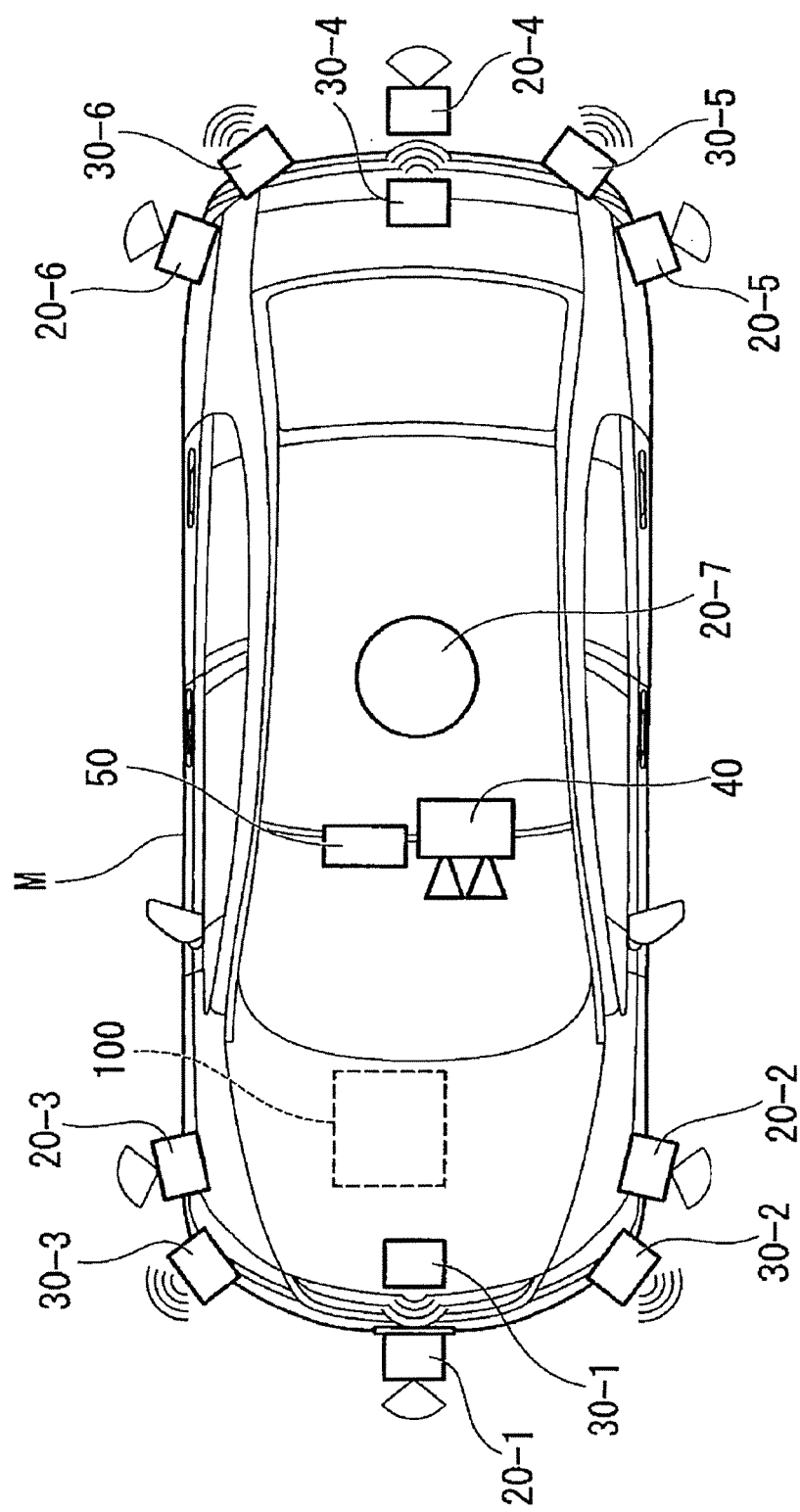
FIG. 1 is a diagram illustrating components of a vehicle on which a vehicle control system 100 according to an embodiment is mounted.

FIG. 1 is a diagram illustrating components of a vehicle on which a vehicle control system 100 of an embodiment is mounted (hereinafter referred to as host vehicle M). The vehicle on which the vehicle control system 100 is mounted is, for example, a two-wheeled, three-wheeled, or four-wheeled car, and includes a car including an internal combustion engine such as a diesel engine or a gasoline engine as a power source, an electric car including an electric motor as a power source, a hybrid car including both of an internal combustion engine and an electric motor, or the like. The electric car, for example, is driven using electric power discharged by a battery, such as a secondary battery, a hydrogen fuel cell, a metal fuel cell, or an alcohol fuel cell.

As illustrated in FIG. 1, sensors such as finders 20-1 to 20-7, radars 30-1 to 30-6, and a camera (an imaging unit) 40, the navigation device (display unit) 50, and the vehicle control system 100 are mounted on the host vehicle M.

The finders 20-1 to 20-7 are, for example, LIDARs (light detection and ranging or laser imaging detection and ranging) that measure scattered light with respect to irradiation light and measure a distance to a target. For example, the finder 20-1 is attached to a front grille or the like, and the finders 20-2 and 20-3 are attached to a side of a vehicle body, a door mirror, the inside of a headlamp, the vicinity of a side lamp, or the like. The finder 20-4 is attached to a trunk lid or the like, and the finders 20-5 and 20-6 are attached to, for example, a side of a vehicle body or the inside of a tail light. The finders 20-1 to 20-6 described above have, for example, a detection region of about 150° with respect to a horizontal direction. Further, the finder 20-7 is attached to a roof or the like. The finder 20-7 has, for example, a detection region of 360° with respect to a horizontal direction.

The radars 30-1 and 30-4 are, for example, long-distance millimeter wave radars having a detection region in a depth direction wider than other radars. Further, the radars 30-2, 30-3, 30-5, and 30-6 may be medium-distance millimeter wave radars having a detection region in a depth direction narrower than the radars 30-1 and 30-4.

Hereinafter, when the finders 20-1 to 20-7 are not particularly distinguished, the finders 20-1 to 20-7 are simply described as "finders 20", and when the radars 30-1 to 30-6 are not particularly distinguished, the radars 30-1 to 30-6 are simply described as "radars 30." The radars 30 detect, for example, an object using a frequency modulated continuous wave (FM-CW) scheme.

The camera 40 is, for example, a digital camera using a solid-state imaging element such as a charge coupled device (CCD) or a complementary metal oxide semiconductor (CMOS). The camera 40 is attached to an upper portion of a front windshield, a back surface of an interior mirror, or the like. The camera 40 periodically repeatedly images, for example, in front of the host vehicle M. The camera 40 may be a stereo camera including a plurality of cameras.

The configuration illustrated in FIG. 1 is merely an example, and parts of the configuration may be omitted or other configurations may be added.

Figure 2:
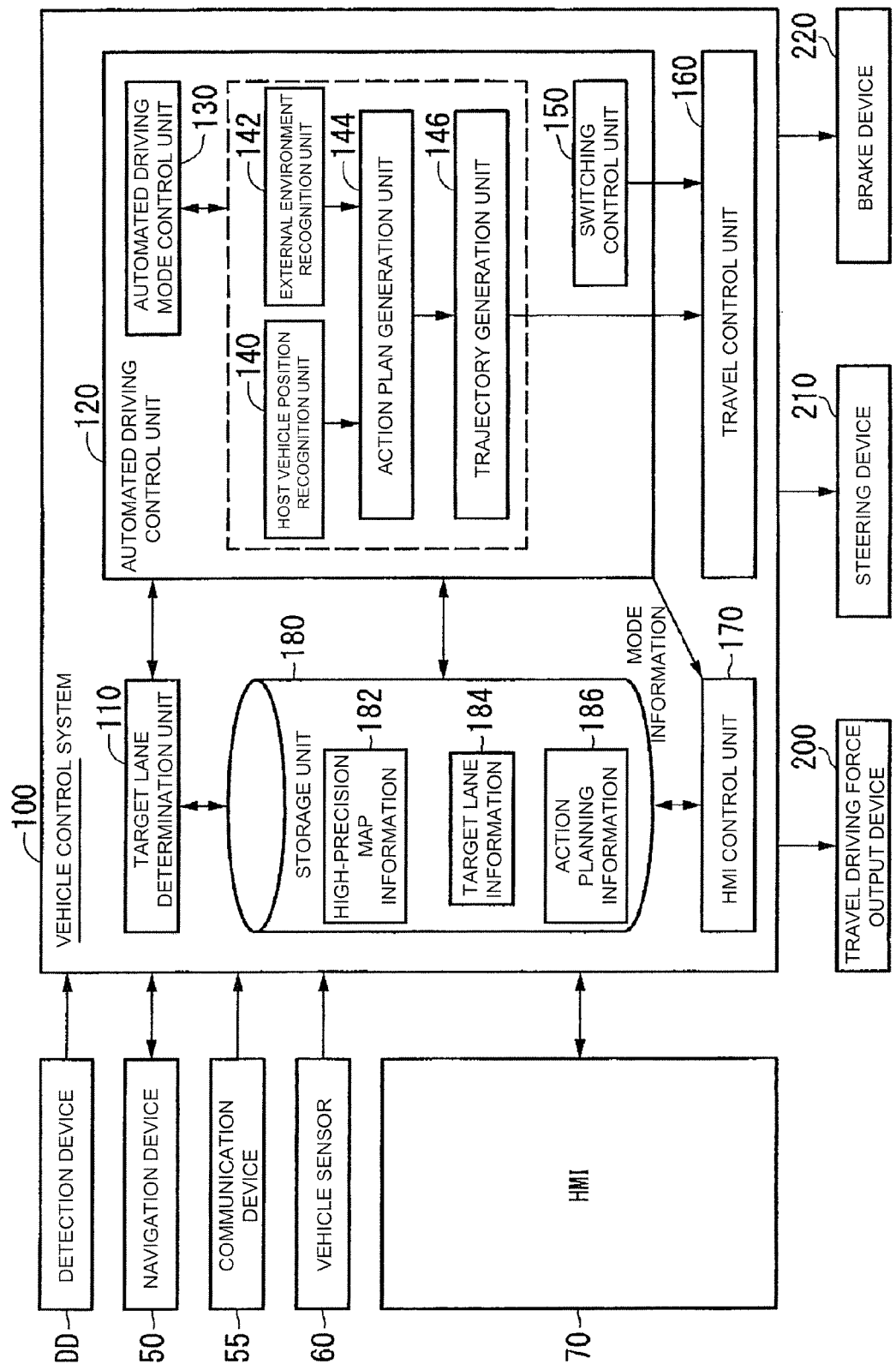
FIG. 2 is a functional configuration diagram mainly illustrating the vehicle control system 100.

FIG. 2 is a functional configuration diagram mainly illustrating the vehicle control system 100. A detection device DD including the finder 20, the radar 30, and the camera 40, or the like, the navigation device 50, the communication device 55, the vehicle sensor 60, a human machine interface (HMI) 70, the vehicle control system 100, a travel driving force output device 200, a steering device 210, and a brake device 220 are mounted on the host vehicle M. The apparatus or devices are connected to each other by a multiplex communication line such as a controller area network (CAN) communication line, a serial communication line, a wireless communication network, or the like. A vehicle control system in the aspects does not indicate only the "vehicle control system 100" and may include a configuration (for example, the detection device DD and the HMI 70) other than the vehicle control system 100.

The navigation device 50 includes, for example, a global navigation satellite system (GNSS) receiver or map information (navigation map), a touch panel display device functioning as a user interface, a speaker, and a microphone. The navigation device 50 specifies a position of the host vehicle M using the GNSS receiver, and derives a route from the position to a destination designated by a user. The route derived by the navigation device 50 is provided to a target lane determination unit 110 of the vehicle control system 100. The position of the host vehicle M may be specified or complemented by an inertial navigation system (INS) using the output of the vehicle sensors 60. Further, the navigation device 50 performs guidance through sound or navigation display with respect to the route to the destination. A configuration for specifying the position of the host vehicle M may be provided independently of the navigation device 50. Further, the navigation device 50 may be realized by, for example, a function of a terminal device such as a smartphone or a tablet terminal owned by the user. In this case, transmission and reception of information are performed by wireless or wired communication between the terminal device and the vehicle control system 100.

The communication device 55 performs, for example, wireless communication using a cellular network, a Wi-Fi network, Bluetooth (registered trademark), dedicated short range communication (DSRC), or the like. The communication device 55 can acquire, for example, traffic information (for example, traffic jam information), weather information, or the like from an external device connected by wireless communication.

The vehicle sensors 60 include a vehicle speed sensor that detects a vehicle speed (traveling speed), an acceleration sensor that detects an acceleration, a yaw rate sensor that detects an angular velocity around a vertical axis, an azimuth sensor that detects a direction of the host vehicle M, and the like.

Figure 3:
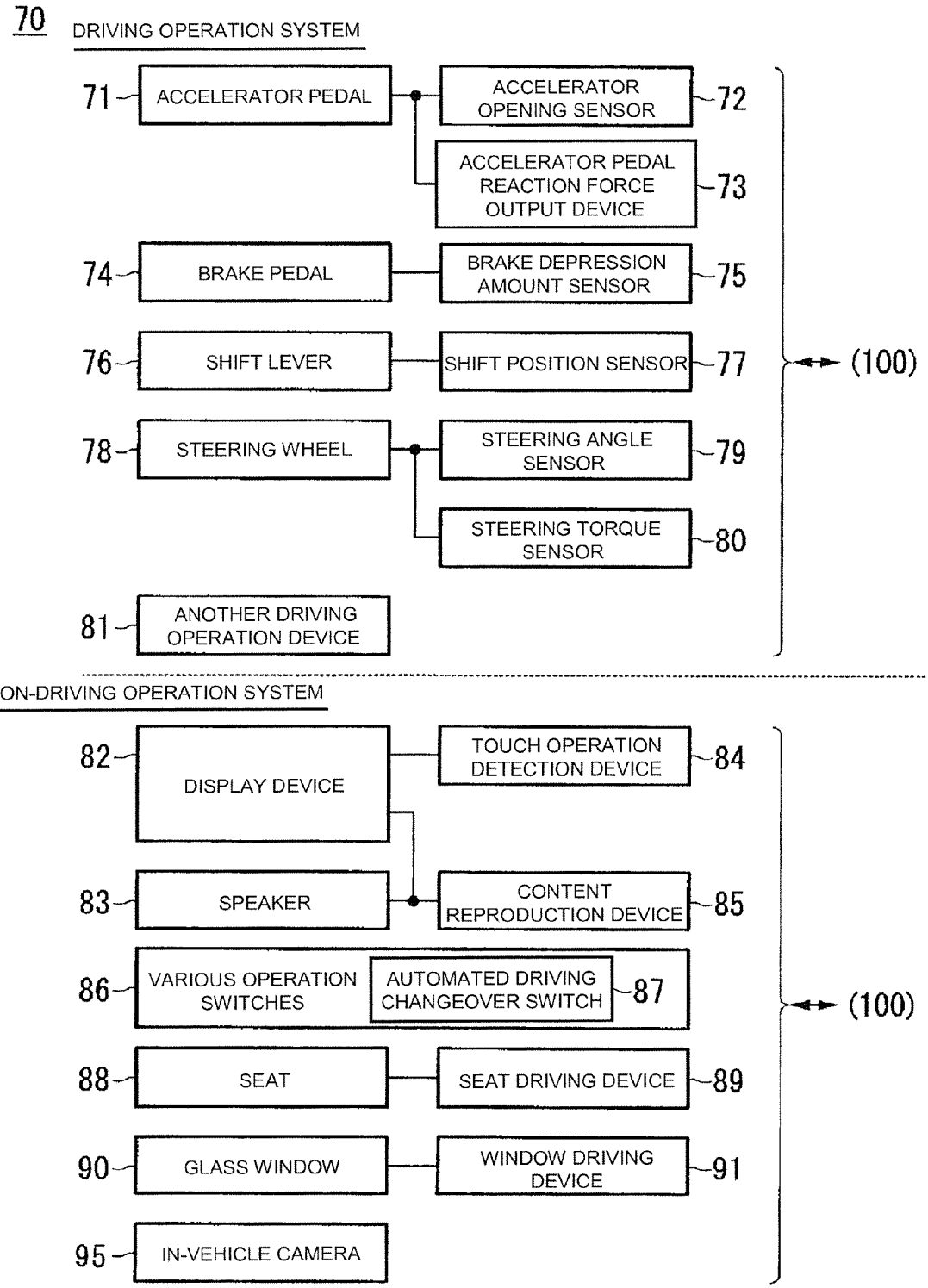
FIG. 3 is a configuration diagram of an HMI 70.

FIG. 3 is a configuration diagram of the HMI 70. The HMI 70 includes, for example, a configuration of a driving operation system, and a configuration of a non-driving operation system. A boundary therebetween is not clear, and the configuration of a driving operation system may include a function of a non-driving operation system (or vice versa). The driving operation system is an example of an operation reception unit that receives an operation of a vehicle occupant (occupant) of the host vehicle M. Further, the non-driving operation system includes an interface device.

The HMI 70 includes, for example, an accelerator pedal 71, an accelerator opening sensor 72, an accelerator pedal reaction force output device 73, a brake pedal 74, a brake depression amount sensor (or a master pressure sensor, or the like) 75, a shift lever 76, a shift position sensor 77, a steering wheel 78, a steering angle sensor 79, a steering torque sensor 80, and another driving operation device 81, as the configuration of the driving operation system.

The accelerator pedal 71 is an operator for receiving an acceleration instruction from the vehicle occupant (or a deceleration instruction by a return operation). The accelerator opening sensor 72 detects a depression amount of the accelerator pedal 71, and outputs an accelerator opening signal indicating the depression amount to the vehicle control system 100. In place of the accelerator opening signal being output to the vehicle control system 100, the accelerator opening signal may be directly output to the travel driving force output device 200, the steering device 210, or the brake device 220. The same applies to the configuration of another driving operation system to be described below. The accelerator pedal reaction force output device 73 outputs a force (operation reaction force) in a direction opposite to an operation direction to the accelerator pedal 71, for example, according to an instruction from the vehicle control system 100.

The brake pedal 74 is an operator for receiving a deceleration instruction from the vehicle occupant. The brake depression amount sensor 75 detects a depression amount (or depression force) of the brake pedal 74, and outputs a brake signal indicating a result of the detection to the vehicle control system 100.

The shift lever 76 is an operator for receiving an instruction to change a shift stage from the vehicle occupant. The shift position sensor 77 detects the shift stage instructed by the vehicle occupant, and outputs a shift position signal indicating a result of the detection to the vehicle control system 100.

The steering wheel 78 is an operator for receiving a turning instruction from the vehicle occupant. The steering angle sensor 79 detects an operation angle of the steering wheel 78, and outputs a steering angle signal indicating a result of the detection to the vehicle control system 100. The steering torque sensor 80 detects a torque applied to the steering wheel 78, and outputs a steering torque signal indicating a result of the detection to the vehicle control system 100. As control regarding the steering wheel 78, for example, the torque may be output to a steering shaft using a reaction motor or the like to output an operation reaction force to the steering wheel 78.

The other driving operation device 81 is, for example, a joystick, a button, a dial switch, a graphical user interface (GUI) switch, or the like. The other driving operation device 81 receives an acceleration instruction, a deceleration instruction, a turning instruction, or the like and outputs the instruction to the vehicle control system 100.

The HMI 70 includes, for example, a display device (display unit) 82, a speaker 83, a touch operation detection device 84, a content reproduction device 85, a various operation switches 86, a seat 88, a seat driving device 89, a glass window 90, a window driving device 91, and an in-vehicle camera (an aging unit) 95, as the configuration of the non-driving operation system.

The display device 82 is, for example, a liquid crystal display (LCD), an organic electroluminescence (EL) display device, or the like, which is attached to each portion of an instrument panel, or at an arbitrary place facing a passenger seat or a rear seat. Further, the display device 82 may be a head-up display (HUD) that projects an image onto a front windshield or another window. The speaker 83 outputs sound. When the display device 82 is a touch panel, the touch operation detection device 84 detects a touch position in a display screen of the display device 82 and outputs the touch position to the vehicle control system 100. When the display device 82 is not a touch panel, the touch operation detection device 84 may be omitted.

The content reproduction device 85 includes, for example, a digital versatile disc (DVD) reproduction device, a compact disc (CD) reproduction device, a television receiver, or a device that generates various guidance images. The display device 82, the speaker 83, the touch operation detection device 84, and the content reproduction device 85 may be partially or entirely the same as the navigation device 50. The display device 82, the speaker 83, the content reproduction device 85, and the navigation device 50 described above are all an example of the interface device, but the present invention is not limited thereto.

The various operation switches 86 are arranged at arbitrary places in the vehicle. The various operation switches 86 includes an automated driving changeover switch 87 that instructs starting (or future starting) and stopping of automated driving. The automated driving changeover switch 87 may be any one of a graphical user interface (GUI) switch and a mechanical switch. Further, the various operation switches 86 may include a switch for driving the seat driving device 89 or the window driving device 91.

The seat 88 is a seat on which the vehicle occupant sits. The seat driving device 89 freely drives a reclining angle of the seat 88, a position in the frontward and backward directions, a yaw angle, or the like. Further, the seat driving device 89 causes a vibration device provided in the seat 88 to vibrate. Glass windows 90 are provided in, for example, each door. The window driving device 91 drives the glass windows 90 such that glass windows 90 open or close.

The in-vehicle camera 95 is a digital camera using a solid-state imaging element such as a CCD or CMOS. The in-vehicle camera 95 is attached at a position at which at least a head (including a face) of the vehicle occupant who performs a driving operation can be imaged, such as that of a rearview mirror, a steering boss portion, or an instrument panel. The in-vehicle camera 95, for example, periodically repeatedly images the vehicle occupant.

The travel driving force output device 200, the steering device 210, and the brake device 220 will be described prior to the description of the vehicle control system 100.

The travel driving force output device 200 outputs a travel driving force (torque) for vehicle traveling to driving wheels. When the host vehicle M is a car using an internal combustion engine as a power source, the travel driving force output device 200 includes, for example, an engine, a transmission, and an engine electronic control unit (ECU) for controlling the engine. When the host vehicle M is an electric car using an electric motor as a power source, the travel driving force output device 200 includes a travel motor, and an motor ECU that controls the travel motor. When the host vehicle M is a hybrid car, the travel driving force output device 200 includes an engine, a transmission, a travel motor, an engine ECU, a travel motor, and a motor ECU. When the travel driving force output device 200 includes only an engine, the engine ECU adjusts a throttle opening, a shift stage, or the like of the engine according to the information input from a travel control unit 160 to be described below. When the travel driving force output device 200 includes only a travel motor, the motor ECU adjusts a duty ratio of a PWM signal to be applied to the travel motor according to the information input from the travel control unit 160. When the travel driving force output device 200 includes an engine and a travel motor, the engine ECU and the motor ECU control the driving force in cooperation with each other according to the information input from the travel control unit 160.

The steering device 210 includes, for example, a steering ECU and an electric motor. The electric motor, for example, applies a force to a rack and pinion mechanism to change an orientation of a steering wheel. The steering ECU drives the electric motor according to the information input from the vehicle control system 100, the input steering angle or steering torque information to change the orientation of the steering wheel.

The brake device 220 is, for example, an electric servo brake device including a brake caliper, a cylinder that transfers hydraulic pressure to the brake caliper, an electric motor that generates hydraulic pressure in the cylinder, and a brake control unit. The brake control unit of the electric servo brake device controls the electric motor according to the information input from the travel control unit 160 so that a brake torque according to a brake operation is output to each wheel. The electric servo brake device may include, as a backup, a mechanism at transfers the hydraulic pressure generated by an operation of the brake pedal to the cylinder via a master cylinder. The brake device 220 is not limited to the electric servo brake device described above, and may be an electronically controlled hydraulic brake device. The electronically controlled hydraulic brake device controls an actuator according to the information input from the travel control unit 160 and transfers the hydraulic pressure of the master cylinder to the cylinder. Further, the brake device 220 may include a regenerative brake using the travel motor that may be included in the travel driving force output device 200.

[Vehicle Control System]

Hereinafter, the vehicle control system 100 will be described. The vehicle control system 100 is realized by, for example, one or more processors or hardware having equivalent functions. The vehicle control system 100 may have a configuration in which a processor such as a central processing unit (CPU), a storage device, an electronic control unit (ECU) in which a communication interface is connected by an internal bus, a micro-processing unit (MPU), and the like are combined.

Referring back to FIG. 2, the vehicle control system 100 includes, for example, a target lane determination unit 110, an automated driving control unit 120, a travel control unit 160, an HMI control unit 170, and a storage unit 180. The automated driving control unit 120 includes, for example, an automated driving mode control unit 130, a vehicle position recognition unit 140, an external environment recognition unit 142, an action plan generation unit 144, a trajectory generation unit 146, and a switching control unit 150. Each unit of the target lane determination unit 110 and the automated driving control unit 120 and a portion or all of the travel control unit 160 are realized by the processor executing a program (software). Further, some or all of these may be realized by hardware such as a large scale integration (LSI) or an application specific integrated circuit (ASIC) or may be realized by a combination of software and hardware.

For example, information such as high-precision map information 182, target lane information 184, action planning information 186, HMI control information 188, and mode-specific operation information 190 is stored in the storage unit 180. The storage unit 180 is realized by a read only memory (ROM), a random access memory (RAM), a hard disk drive (HDD), a flash memory, or the like. The program executed by the processor may be stored in the storage unit 180 in advance, or may be downloaded from an external device via a vehicle Internet facility or the like. Further, the program may be installed in the storage unit 180 by a portable storage medium having the program stored thereon being mounted on a driving device (not illustrated). A computer (vehicle-mounted computer) of the vehicle control system 100 may be one distributed by a plurality of computer devices.

The target lane determination unit 110 is realized by, for example, an MPU. The target lane determination unit 110 divides a route provided from the navigation device 50 into a plurality of blocks (for example, divides the route every 100 [m] with respect to a vehicle traveling direction), and determines a target lane for each block with reference to the high-precision map information 182. The target lane determination unit 110 determines, for example, what lane from the left the vehicle travels along. For example, when there is a branching point, a merging point, or the like in the route, the target lane determination unit 110 determines the target lane so that the host vehicle M can travel along a reasonable travel route for traveling to a branch destination. The target lane determined by the target lane determination unit 110 is stored as target lane information 184 in the storage unit 180.

The high-precision map information 182 is map information that has higher precision than a navigation map of the navigation device 50. The high-precision map information 182 includes, for example, information on a center of the lane or information on a boundary of the lane. Further, road information, traffic regulations information, address information (address and postal code), facilities information, telephone number information, or the like may be included in the high-precision map information 182. The road information includes information indicating a type of road, such as highways, toll roads, national roads, and prefectural roads, the number of lanes of roads, a width of each lane, a gradient of the road, a position of the road (three-dimensional coordinates including longitude, latitude, and height), curvatures of curves of lanes, positions of merging and branching points of a lane, or information on signs or the like provided on a road. The traffic regulations information includes information on blockage of lanes due to construction, traffic accidents, traffic jam, or the like.

The automated driving control unit 120 automatically controls at least one of the acceleration/deceleration and steering of the host vehicle M so that the host vehicle M travels along a route to a destination. Further, the automated driving control unit 120 performs automated driving control in one of a plurality of modes in which degrees of automated driving are different. The degree of automated driving is, for example, one or both of a degree of obligation regarding driving (hereinafter simply referred to as "obligation regarding driving") of the vehicle required for the vehicle occupant of the host vehicle M and a degree of operation tolerance for each interface device of the HMI 70 that receives an operation of a vehicle occupant and outputs information.

The automated driving mode control unit 130 determines a mode of the automated driving that is performed by the automated driving control unit 120. The automated driving modes in this embodiment include the following modes. The following are merely examples, and the number of modes and the details of the modes of automated driving may be set arbitrarily.

[First Mode]

A first mode is a mode of which a degree of automated driving is highest as compared with the other modes. When the first mode is implemented, all vehicle controls such as complicated merging control are automatically performed. Accordingly, there is no obligation regarding driving required for the vehicle occupant. For example, the vehicle occupant need not monitor the vicinity or the state of the host vehicle M (there is no vicinity surveillance obligation required for the vehicle occupant). Further, the vehicle occupant need not perform a driving operation with respect to the accelerator pedal, the brake pedal, the steering wheel, or the like (there is no driving operation obligation required for the vehicle occupant), and can direct attention to something other than the driving of the vehicle.

Here, an example of the first mode includes a traffic jam following mode of following a preceding vehicle at the time of traffic jam (low-speed following mode). In the first mode, for example, by following a preceding vehicle on a crowded highway, for example, as in Traffic Jam Pilot (TJP), it is possible to realize safe automated driving, and the TJP ends at a point in time at which the traffic jam is eliminated. For the elimination of the traffic jam, for example, when a traveling speed of the host vehicle M is equal to or higher than a predetermined speed (for example, 40 km/h), the traffic jam can be determined to be eliminated, but the present invention is not limited thereto. For example, the elimination of the traffic jam may be detected by receiving traffic information (traffic jam information) from an external device using the communication device 55. Further, the first mode may be switched to another mode at a timing at which the TJP ends, but the modes may be switched after a predetermined time after the TJP ends, or at a speed higher than a speed at which the TJP ends. The first mode is a mode in which operation tolerance of each interface device (non-driving operation system) of the HMI 70 is highest in comparison with other modes.

[Second Mode]

A second mode is a mode in which the degree of automated driving is next highest after the first mode. When the second mode is performed, all vehicle controls are automatically performed in principle, but a driving operation of the host vehicle M is entrusted to the vehicle occupant according to a scene (obligation regarding vehicle driving is higher in comparison with the first mode). Therefore, the vehicle occupant needs to monitor the vicinity or the state of the host vehicle M and be aware of the driving of the vehicle (obligation regarding vehicle driving increases in comparison with the first mode). The second mode is a mode in which the operation tolerance of each interface device (non-driving operation system) of the HMI 70 is lower than the first mode.

[Third Mode]

A third mode is a mode in which the degree of automated driving is next highest after the second mode. When the third mode is performed, the vehicle occupant needs to perform a confirmation operation according to a scene with respect to the HMI 70 (obligation regarding the vehicle driving is higher in comparison with the second mode). In the third mode, for example, when the vehicle occupant is notified of a lane changing timing and performs an operation for instructing lane changing with respect to the HMI 70, automatic lane change is performed. Therefore, the vehicle occupant needs to monitor the vicinity or the state of the host vehicle M (obligation regarding vehicle driving is higher in comparison with the second mode). The third mode is a mode in which the operation tolerance of each interface device (non-driving operation system) of the HMI 70 is lower than the second mode.

The automated driving mode control unit 130 determines the automated driving mode (driving mode) on the basis of the operation of the vehicle occupant with respect to the HMI 70, an event determined by the action plan generation unit 144, a travel condition determined by the trajectory generation unit 146, or the like. The driving modes may include a manual driving mode. The HMI control unit 170 is notified of the determined automated driving mode (mode information). Further, in the automated driving mode, a limit according to a performance of the detection device DD of the host vehicle M or the like may be set. For example, when the performance of the detection device DD is low, the first mode may not be performed.

In any of the automated driving modes, the driving mode can be switched to the manual driving mode (overriding) by an operation with respect to the configuration of the driving operation system in the HMI 70. Overriding may be initiated, for example, when an operation with respect to the driving operation system of the HMI 70 by the vehicle occupant of the host vehicle M has continued for a predetermined time or longer, when an amount of change in operation is equal to or larger than a predetermined amount of change in operation (for example, an accelerator opening of the accelerator pedal 71, a brake depression amount of the brake pedal 74, or the steering angle of the steering wheel 78), and when an operation with respect to the driving operation system has been performed a predetermined number of times or more.

The vehicle position recognition unit 140 of the automated driving control unit 120 recognize a lane along which the host vehicle M is traveling (a travel lane), and a relative position of the host vehicle M with respect to the travel lane on the basis of the high-precision map information 182 stored in the storage unit 180 and the information input from the finders 20, the radars 30, the camera 40, the navigation device 50, or the vehicle sensors 60.

The vehicle position recognition unit 140, for example, compares a pattern of a road section line recognized from the high-precision map information 182 (for example, an arrangement of solid and dotted lines) with a pattern of the road section line around the host vehicle M recognized from an image captured by the camera 40 to recognize the travel lane. In this recognition, a position of the host vehicle M that is acquired from the navigation device 50 or a processing result of the INS may be taken into account.

Figure 4:
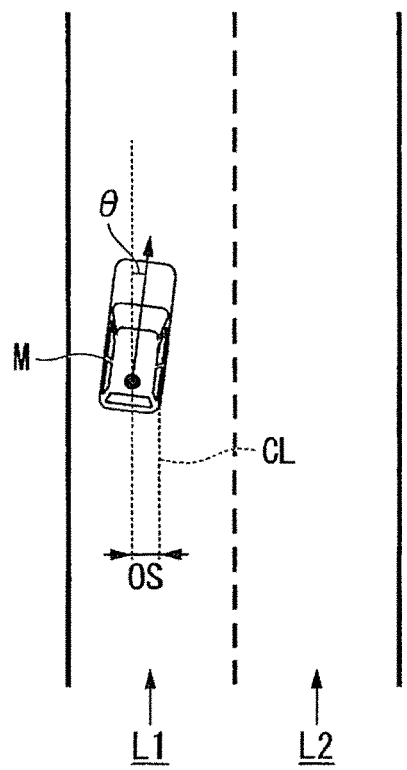
FIG. 4 is a diagram illustrating a state in which a relative position of a host vehicle M with respect to a travel lane L1 is recognized by a vehicle position recognition unit 140.

FIG. 4 is a diagram illustrating a state in which a relative position of the host vehicle M with respect to a travel lane L1 is recognized by the vehicle position recognition unit 140. The vehicle position recognition unit 140 recognizes, for example, a divergence OS from a travel lane center CL of a reference point (for example, the centroid) of the host vehicle M and an angle θ formed between a traveling direction of the host vehicle M and a line connected to the travel lane center CL, as the relative position of the host vehicle M with respect to the travel lane L1. Instead of this, the vehicle position recognition unit 140 may recognize, for example, a position of a reference point of the host vehicle M with respect to any one of side ends of the host vehicle lane L1 as the relative position of the host vehicle M with respect to the travel lane. The relative position of the host vehicle M recognized by the vehicle position recognition unit 140 is provided to the action plan generation unit 144.

The external environment recognition unit 142 recognizes a state such as a position, a speed, or an acceleration of surrounding vehicles on the basis of the information input from the finder 20, the radar 30, the camera 40, or the like. A surrounding vehicle is, for example, a vehicle that travels near the host vehicle M, which is a vehicle that travels in the same direction as the host vehicle M. A position of the surrounding vehicle may be represented by a representative point such as the centroid or a corner of another vehicle or may be represented by a region represented by an outline of the other vehicle. The "state" of the surrounding vehicle may include an acceleration of the surrounding vehicle, and whether or not the surrounding vehicle is changing lane (or whether the surrounding vehicle is trying to change lane), which is recognized on the basis of the information of the various devices. Further, the external environment recognition unit 142 recognizes positions of guard rails, utility poles, parked vehicles, pedestrians, or other objects, in addition to surrounding vehicles.

The action plan generation unit 144 sets a start point of automated driving and/or a destination of automated driving. The start point of automated driving may be a current position of the host vehicle M or a point at which an operation for instructing the automated driving is performed. The action plan generation unit 144 generates an action plan in a section between the start point and the destination of automated driving. However, the present invention is not limited thereto, and the action plan generation unit 144 may generate an action plan for an arbitrary section.

The action plan includes, for example, a plurality of events that are executed sequentially. The events include, for example, a deceleration event in which the host vehicle M is caused to decelerate, an acceleration event in which the host vehicle M is caused to accelerate, a lane keeping event in which the host vehicle M is caused to travel so that the host vehicle M does not deviate from a travel lane, a lane changing event in which the travel lane is caused to be changed, an overtaking event in which the host vehicle M is caused to overtake a preceding vehicle, a branching event in which a change to a desired lane occurs at a branching point or the host vehicle M is caused to travel so as not to deviate from a current travel lane, a merging event in which the host vehicle M is caused to be accelerated or decelerated in a merging lane for merging a main lane and the travel lane is caused to be changed, and a handover event in which the driving mode is caused to transition from an automated driving mode to a manual driving mode at a scheduled end point of the automated driving mode. The action plan generation unit 144 sets a lane changing event, a branching event, or a merging event to a point at which the target lane determined by the target lane determination unit 110 is switched. Information indicating the action plan generated by the action plan generation unit 144 is stored as the action plan information 186 in the storage unit 180.

Figure 5:
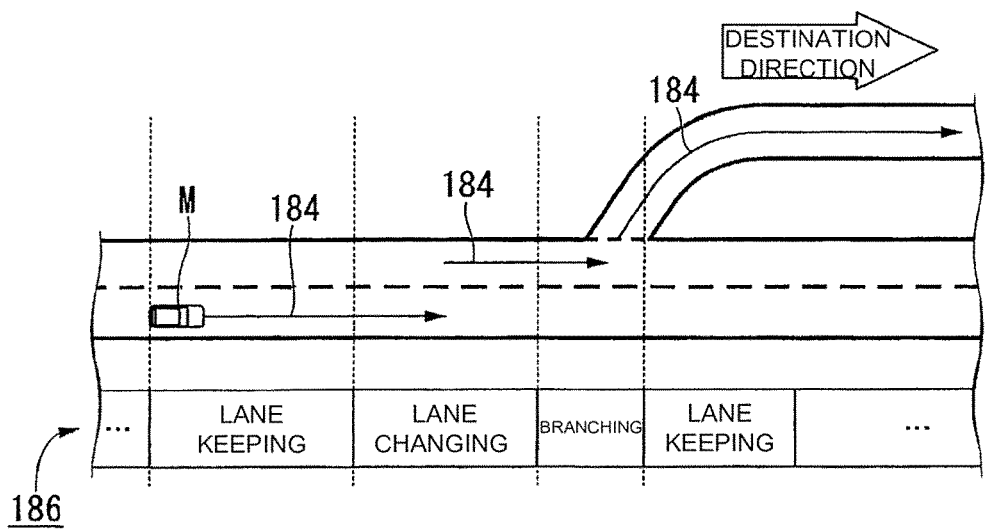
FIG. 5 is a diagram illustrating an example of an action plan generated for a certain section.

FIG. 5 is a diagram illustrating an example of an action plan generated for a certain section. As illustrated in FIG. 5, the action plan generation unit 144 generates an action plan required for the host vehicle M to travel along a target lane indicated by the target lane information 184. The action plan generation unit 144 may dynamically change the action plan regardless of the target lane information 184 according to changes in a situation of the host vehicle M. For example, the action plan generation unit 144 may change an event set in a driving section in which the host vehicle M is scheduled to travel when a speed of a surrounding vehicle recognized by the external environment recognition unit 142 exceeds a threshold value or a moving direction of a surrounding vehicle traveling in a lane adjacent to the host vehicle lane is directed to a moving direction of the host vehicle lane. For example, when an event is set so that a lane changing event is executed after a lane keeping event, and it is found from a recognition result of the external environment recognition unit 142 that a vehicle is traveling at a speed equal to or higher than a threshold value from the rear on a lane that is a lane change destination in the lane keeping event, the action plan generation unit 144 may change the event subsequent to the lane keeping event from a lane changing event to a deceleration event or a lane keeping event. As a result, the vehicle control system 100 can cause the host vehicle M to automatically travel safely even when a change in a state of the external environment occurs.

Figure 6:
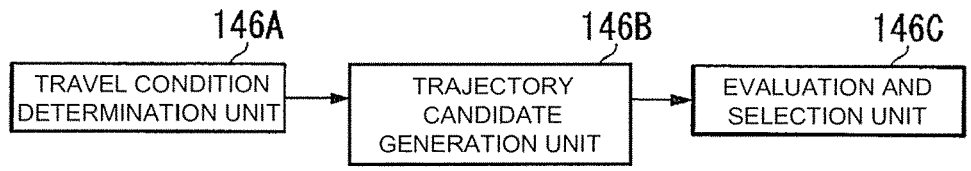
FIG. 6 is a diagram illustrating an example of a configuration of a trajectory generation unit 146.

FIG. 6 is a diagram illustrating an example of a configuration of the trajectory generation unit 146. The trajectory generation unit 146 includes, for example, a travel condition determination unit 146A, a trajectory candidate generation unit 146B, and an evaluation and selection unit 146C.

For example, when a lane keeping event is performed, the travel condition determination unit 146A determines a travel condition of any one of constant speed travel, follow-up travel, low-speed follow-up travel, deceleration travel, cornering, obstacle avoidance travel, and the like. For example, the travel condition determination unit 146A may determine the travel condition to be constant speed travel when there are no other vehicles ahead of the host vehicle M. Further, the travel condition determination unit 146A determines the travel condition as following traveling when traveling by following a preceding vehicle. Further, the travel condition determination unit 146A determines the travel condition to be low-speed follow-up travel in a traffic jam situation or the like. Further, the travel condition determination unit 146A determines the travel condition to be deceleration travel when deceleration of a preceding vehicle is recognized by the external environment recognition unit 142 or when an event such as stopping or parking of a vehicle is performed. Further, when the external environment recognition unit 142 recognizes that the host vehicle M has reached a curved road, the travel condition determination unit 146A determines the traveling condition to be cornering. Further, the travel condition determination unit 146A determines the traveling condition to be obstacle avoidance travel when the external environment recognition unit 142 recognizes an obstacle in front of the host vehicle M.

Figure 7:
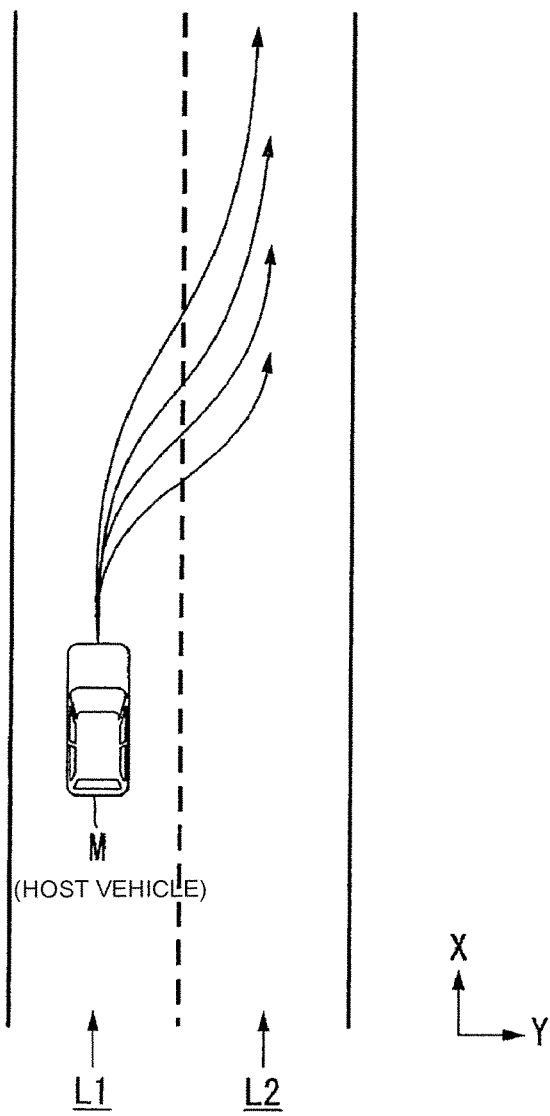
FIG. 7 is a diagram illustrating an example of candidates for a trajectory generated by a trajectory candidate generation unit 146B.

The trajectory candidate generation unit 146B generates candidates for a trajectory on the basis of the travel condition determined by the travel condition determination unit 146A. FIG. 7 is a diagram illustrating an example of candidates for a trajectory generated by the trajectory candidate generation unit 146B. FIG. 7 illustrates the candidates for the trajectory generated when the host vehicle M changes a lane from a lane L1 to a lane L2.

Figure 8:
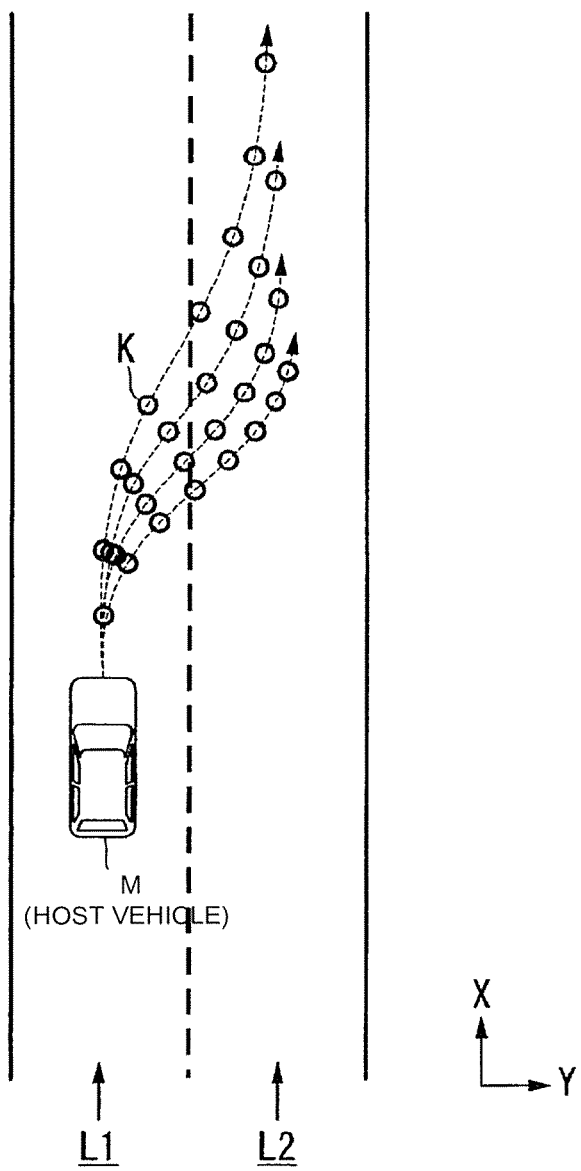
FIG. 8 is a diagram in which candidates for the trajectory generated by the trajectory candidate generation unit 146B are represented by trajectory points K.

The trajectory candidate generation unit 146B determines a trajectory as illustrated in FIG. 7, for example, as a collection of target positions (trajectory points K) that a reference position (for example, the centroid or a rear wheel shaft center) of the host vehicle M will reach, at future predetermined time intervals. FIG. 8 is a diagram in which candidates for the trajectories generated by the trajectory candidate generation unit 146B are represented by the trajectory points K. As an interval between the trajectory points K becomes wider, the speed of the host vehicle M increases, and as the interval between the trajectory points K becomes narrower, the speed of the host vehicle M decreases. Therefore, the trajectory candidate generation unit 146B gradually increases the interval between the trajectory points K when acceleration is desired, and gradually decreases the interval between the trajectory points K when deceleration is desired.

Thus, since the trajectory point K includes a speed component, the trajectory candidate generation unit 146B needs to apply a target speed to each trajectory point K. The target speed is determined according to the travel condition determined by the travel condition determination unit 146A.

Figure 9:
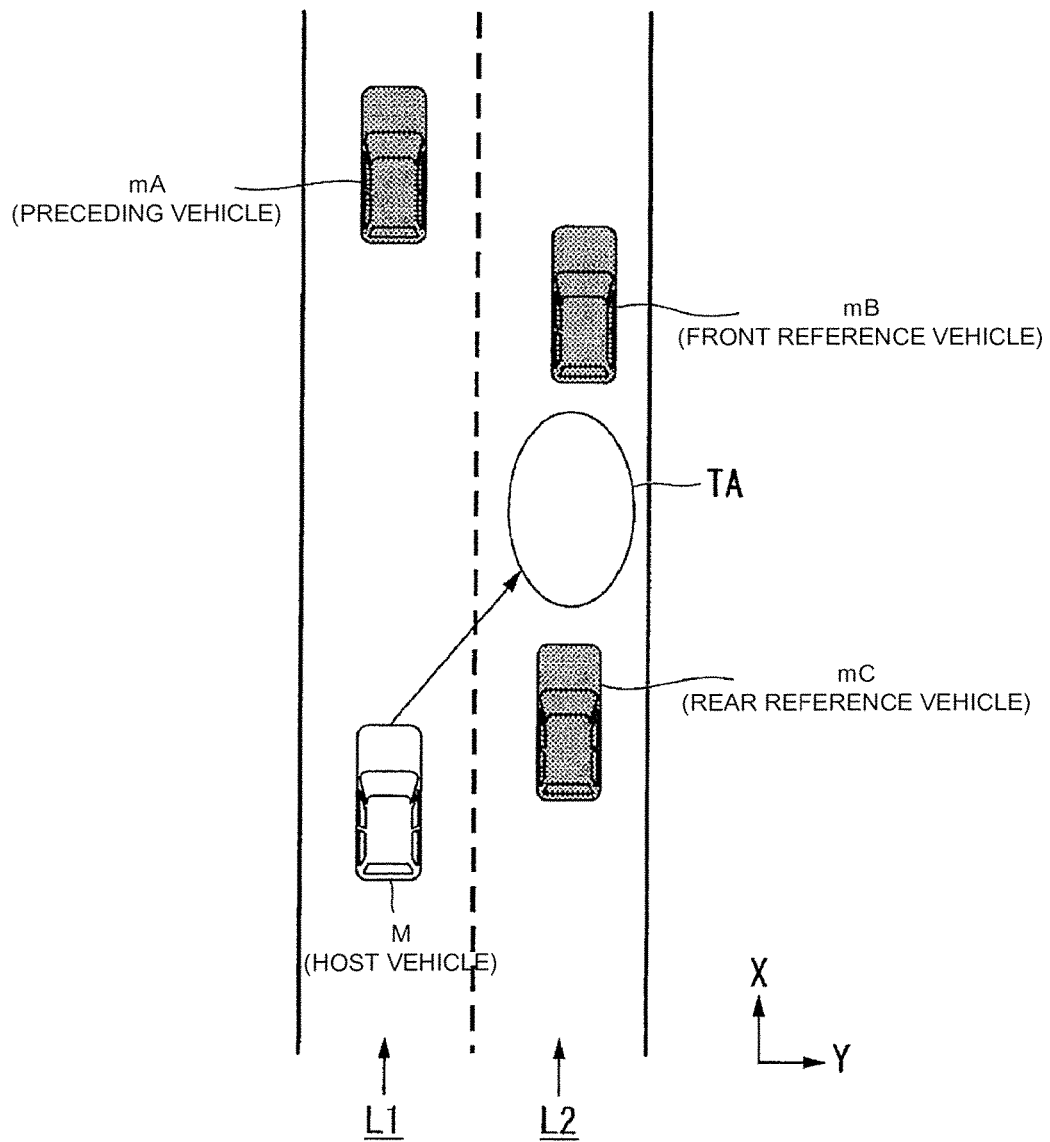
FIG. 9 is a diagram illustrating a lane change target position TA.

Here, a method of determining the target speed when lane change (including branching) is performed will be described. The trajectory candidate generation unit 146B first sets a lane change target position (or merging target position). The lane change target position is set as a relative position with respect to a surrounding vehicle, and is intended to determine "surrounding vehicles between which the lane change is performed". The trajectory candidate generation unit 146B determines the target speed when the lane change is performed in consideration of three surrounding vehicles with reference to the lane change target position. FIG. 9 is a diagram illustrating the lane change target position TA. In FIG. 9, L1 indicates the own lane, and L2 indicates an adjacent lane. Here, a surrounding vehicle traveling immediately before the host vehicle M along the same lane as the host vehicle M is defined as a preceding vehicle mA, a surrounding vehicle traveling immediately before the lane change target position TA is defined as a front reference vehicle mB, and a surrounding vehicle traveling immediately after the lane change target position TA is defined as a rear reference vehicle mC. The host vehicle M needs to perform acceleration and deceleration to move to the side of the lane change target position TA, but in this case, the host vehicle M needs to avoid catching up with the preceding vehicle mA. Therefore, the trajectory candidate generation unit 146B predicts future states of the three surrounding vehicles, and determines a target speed such that there is no interference with any of the surrounding vehicles.

Figure 10:
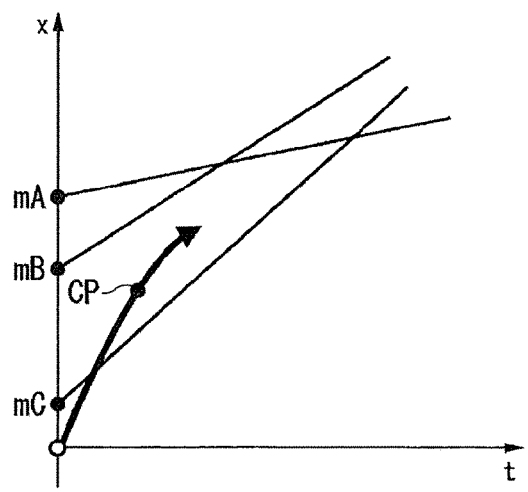
FIG. 10 is a diagram illustrating a speed generation model when speeds of three surrounding vehicles are assumed to be constant.

FIG. 10 is a diagram illustrating a speed generation model when speeds of three surrounding vehicles are constant. In FIG. 10, straight lines extending from mA, mB, and mC indicate displacements in the traveling direction when the respective surrounding vehicles are assumed to travel at constant speed. The host vehicle M needs to be between the front reference vehicle mB and the rear reference vehicle mC at a point CP at which the lane change is completed, and be behind the preceding vehicle mA at a point before the point CP. Under such constraints, the trajectory candidate generation unit 146B derives a plurality of time series patterns of a target speed before the lane change is completed. By applying the time series patterns of the target speed to a model such as a spline curve, a plurality of candidates for the trajectory as illustrated in FIG. 7 described above are derived. A motion pattern for the three surrounding vehicles is not limited to constant speeds as illustrated in FIG. 10, and may be predicted on the assumption of constant accelerations or constant jerks.

The evaluation and selection unit 146C, for example, evaluates candidates for the trajectory generated by the trajectory candidate generation unit 146B from two viewpoints of planability and safety, and selects the trajectory to be output to the travel control unit 160. From the point of view of the planability, for example, when follow-up with respect to an already generated plan (for example, action plan) is high and a total length of the trajectory is short, the evaluation of the trajectory is high. For example, when a lane change to the right is desired, the evaluation of a trajectory returning after a temporary lane change to the left is low. From the viewpoint of the safety, for example, as a distance between the host vehicle and an object (for example, a surrounding vehicle) is long at each trajectory point and the amount of a change in the acceleration/deceleration or the steering angle is small, the evaluation is high.

The switching control unit 150 switches the automated driving mode and the manual driving mode to each other on the basis of the signal input from the automated driving changeover switch 87. Further, the switching control unit 150 switches from the automated driving mode to the manual driving mode on the basis of an operation of instructing acceleration/deceleration or steering for the configuration of the driving operation system in the HMI 70. For example, the switching control unit 150 switches from the automated driving mode to the manual driving mode (overriding) when a state in which an operation amount indicated by the signal input from the configuration of the driving operation system in the HMI 70 exceeds a threshold value is continued for a reference time or more. The switching control unit 150 may cause return to automated driving mode to occur when the operation with respect to a configuration of the driving operation system in the HMI 70 is not detected for a predetermined time after switching to the manual driving mode is performed by overriding. Further, the switching control unit 150, for example, outputs information indicating handover to the HMI control unit 170 in order to notify the vehicle occupant of a handover request in advance when performing a handover control to transition from the automated driving mode to the manual driving mode at a scheduled end point of the automated driving.

The travel control unit 160 controls the travel driving force output device 200, the steering device 210, and the brake device 220 so that the host vehicle M passes through the trajectory generated by the trajectory generation unit 146 at a predetermined time.

The HMI control unit 170 controls the HMI 70 on the basis of the information of the driving mode obtained by the automated driving control unit 120. For example, the HMI control unit 170 controls whether or not the non-driving operation system of the HM 170, the navigation device 50, or the like can be operated by the vehicle occupant on the basis of the driving mode. Further, the HMI control unit 170 outputs predetermined information to the interface device of the HMI 70 before a predetermined time and/or a predetermined speed at which the automated driving mode in which the obligation regarding driving of the vehicle occupant increases is changed.

Figure 11:
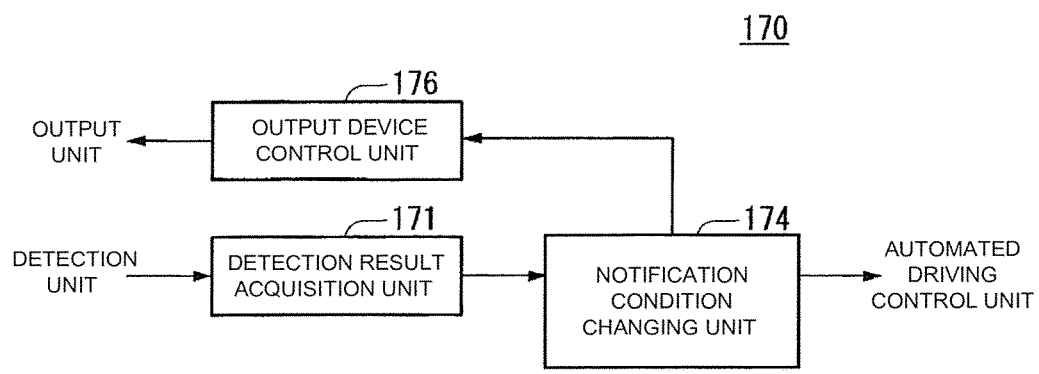
FIG. 11 is a diagram illustrating an example of a configuration of an HMI control unit 170.
Figure 12:
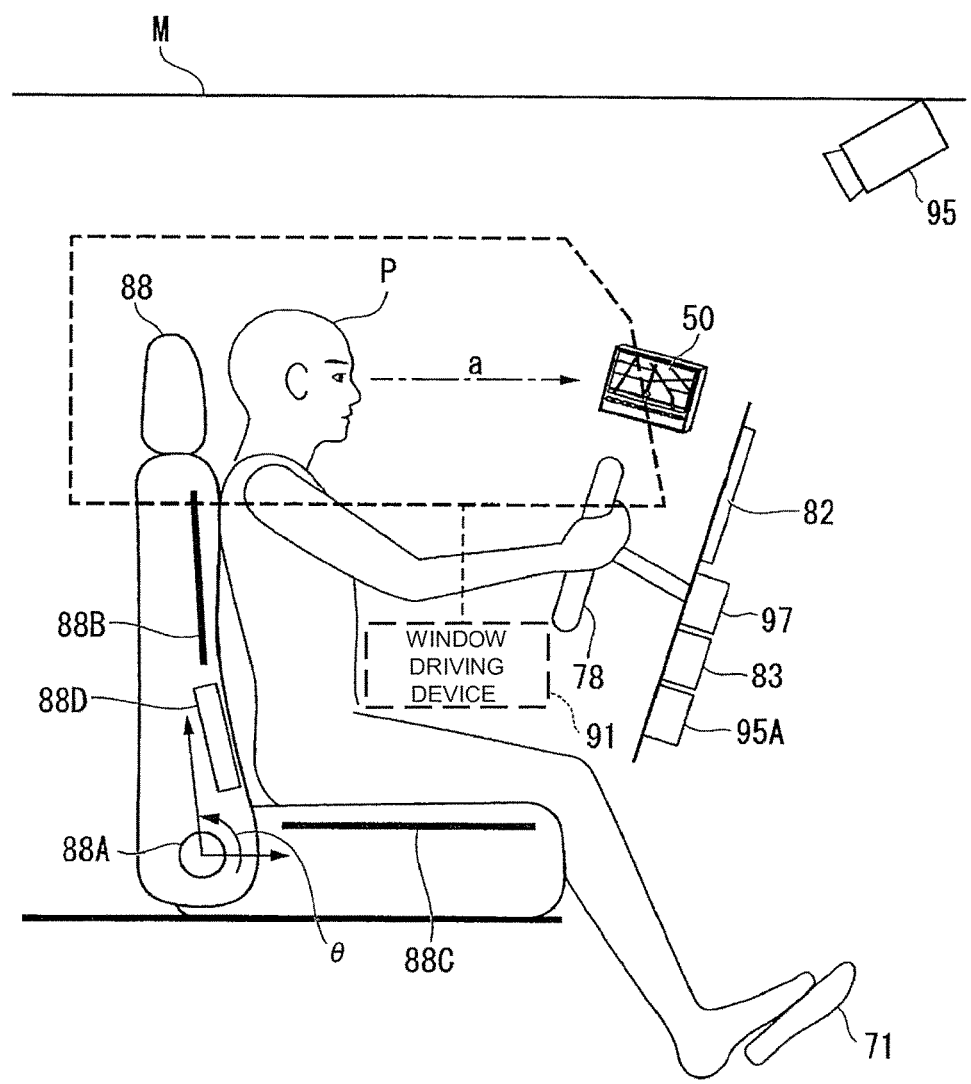
FIG. 12 is a diagram illustrating a detection unit that detects a state of a vehicle occupant and an output unit that notifies notification information.

FIG. 11 is a diagram illustrating an example of a configuration of the HMI control unit 170. FIG. 12 is a diagram illustrating a detection unit that detects a state of a vehicle occupant and an output unit that notifies notification information. A relationship among the detection unit, the HMI control unit 170, and the output unit will be described with reference to FIGS. 11 and 12.

The HMI control unit 170 illustrated in FIG. 11 further includes a detection result acquisition unit 171, a notification condition changing unit 174, and an output device control unit 176, in addition to the function of controlling the HMI 70 on the basis of the information of the driving mode obtained by the above-described automated driving control unit 120.

The detection result acquisition unit 171 acquires a detection result from the detection unit that detects a state of an occupant. For example, the in-vehicle camera 95, the angle detection sensor 88A, the load sensor 88B, the load sensor 88C, or the like illustrated in FIG. 12 may be used as the detection unit.

The notification condition changing unit 174 changes a notification condition for outputting notification information according to the state of the occupant detected by the detection unit. The notification information is, for example, information according to a transition of a degree of automated driving. A case in which the degree of automated driving transitions is a case in which the obligation regarding the driving increases, and is a case including at least one of a case in which a surrounding monitoring obligation of the vehicle occupant increases, a case in which a driving operation obligation of the vehicle occupant increases, and a case in which a degree of consciousness to drive the vehicle increases. A case in which the degree of automated driving transitions includes, for example, a case in which a transition from the first mode to any one of the second mode, the third mode, and the manual driving mode occurs, a case in which a transition from the second mode to the third mode or the manual driving mode occurs, and a case in which a transition from the third mode to the manual driving mode occurs. A method of changing the notification condition includes a case in which the notification timing is changed, and a case in which the output device that performs notification is changed.

When the notification condition changing unit 174 changes the timing at which the notification information is output, the notification condition changing unit 174 changes the timing on the basis of a degree of a divergence between the state of the occupant detected by the detection unit and the state of the occupant according to the degree by which automated driving is transition. More specifically, the notification condition changing unit 174 changes the timing at which the notification information is output to before a reference timing when the degree of divergence between the state of the occupant and the state of the occupant according to the degree by which automated driving is transition is greater than a predetermined value, and changes the timing at which the notification information is output to after the reference timing when the degree of divergence is smaller than the predetermined value. The reference timing is a notification timing determined according a case in which the degree of automated driving transitions, and may be, for example, a timing that is before and after an output time of the notification information, or a timing that is before and after a position at which the notification information is determined to be output on the travel route from a current position of the host vehicle M to a destination. In this embodiment, a temporal timing will be described as an example.

When the notification condition changing unit 174 changes the output device for outputting the notification information, the notification condition changing unit 174 changes the output device from the output device selected as an output target among a plurality of output devices to another output device. For example, the notification condition changing unit 174 selects a display device as an output target device when it is determined that the occupant can view display content of the display device among the plurality of output devices, and selects an output device other than the display device as the output target device when it is determined that the occupant cannot view the display content. Thus, since the output device is changed on the basis of a state of the occupant, it is possible to output the notification information from the output device corresponding to the state of the occupant. Thus, it is possible to cause the occupant to easily recognize the notification information.

Further, the notification condition changing unit 174 changes the output device that outputs the notification information on the basis of the state of the occupant detected by the detection unit, which is obtained after the notification information is output from the output device. For example, when there is a change in the state of the occupant after the notification information is output, it is possible to change the notification condition according to a state after there is the change. When there is no change in the state of the occupant after the notification information is output, it is possible to change the output device into an output device in which the change is likely to occur.

Here, for example, the navigation device 50, the display device 82, the speaker 83, the seat driving device 89, the window driving device 91, an air-conditioning device (air conditioner) for air conditioning of the inside of the host vehicle M, or the like can be used as the output device. Further, when the navigation device 50 and the content reproduction device 85 are not in common, that is, when the navigation device 50 and the content reproduction device 85 are configured as separate devices rather than an integral device, the content reproduction device 85 can be used as the output device.

For example, the notification condition changing unit 174 determines the notification condition for outputting the notification information according to an image in the host vehicle M captured by the in-vehicle camera 95 and/or a state of the inside of the host vehicle M detected by the angle detection sensor 88A, the load sensor 88B, and the load sensor 88C, or the like provided in the seat 88, as illustrated in FIG. 12.

For example, when which of states such as a posture or a line-of-sight direction of the vehicle occupant of the host vehicle M, and whether or not the vehicle occupant is asleep is determined from the image captured by the in-vehicle camera 95, the notification condition changing unit 174 first determines a position of a face of the vehicle occupant from shape information and/or luminance information included in the captured image. Then, the notification condition changing unit 174 determines an opening and closing state of eyes from the position of the face of the vehicle occupant, and determines whether or not the vehicle occupant is asleep on the basis of a result of the determination. For example, the notification condition changing unit 174 determines that the vehicle occupant is asleep when determining that the vehicle occupant closes the eyes for a few seconds or more (for example, 30 seconds or more). Further, the notification condition changing unit 174 determines whether or not the vehicle occupant grips the steering wheel 78 from the image captured by the in-vehicle camera 95.

Further, another in-vehicle camera is provided as the in-vehicle camera 95A and installed under the instrument panel, in addition to the in-vehicle camera 95. This in-vehicle camera 95A images the vicinity of the pedals (the accelerator pedal 71 and the brake pedal 74).

Further, the notification condition changing unit 174 may determine the state of the vehicle occupant according to a reclining angle θ between a seat portion and a backrest portion of the seat 88 detected by the angle detection sensor 88A, and/or a load distribution obtained from the load sensors 88B provided in the backrest portion of the seat 88 and the load sensor 88C provided in the seat portion of the seat 88. For example, the notification condition changing unit 174 determines that the vehicle occupant is asleep when the reclining angle θ of the seat portion and the backrest portion of the seat 88 is equal to or greater than a predetermined angle θth (for example, 120°). Further, the notification condition changing unit 174 determines that the vehicle occupant is asleep when the load distribution obtained by the load sensor 88B and/or the load sensors 88C is a predetermined distribution and, for example, when the load distribution is similar or identical to a load distribution when the vehicle occupant is asleep, and determines that the vehicle occupant is directed in any one of directions other than the traveling direction when the load distribution is similar or identical to a load distribution when the vehicle occupant is directed in a direction other than the traveling direction, such as a right direction, left direction, and a rearward direction.

When the output device control unit 176 receives an instruction according to the notification condition from the notification condition changing unit 174, the output device control unit 176 outputs a control command to each output device so that the notification information is output from the output device according to the notification condition in the instruction. Examples of the output device that is a target to which the control command is output include the navigation device 50, the display device 82, the blowing-out port 97, the speaker 83, and the vibration device 88D. Each output device outputs the notification information in the notification condition according to the control command from the output device control unit 176.

The navigation device 50, the display device 82, the speaker 83, and the blowing-out port 97 are installed in a portion of or around the instrument panel.

The navigation device 50 and the display device 82 have a function of displaying the notification information according to an instruction from the HMI control unit 170. This display device 82 may be an LCD, an organic EL display device, or the like. Further, the display device 82 may be an HUD that projects an image onto a windshield or other windows. The speaker 83 is provided at a plurality of places such as the side or the rear of the host vehicle, in addition to the instrument panel. The vibration device 88D is provided in at least one of a backrest portion or a seat portion of the seat 88 and is driven to vibrate on the basis of a driving signal from the seat driving device 89, making it possible to apply the vibration to the vehicle occupant. The blowing-out port 97 supplies air-conditioned air supplied by the air conditioning device into the host vehicle. The blowing-out port 97, for example, is provided in a portion of or around the instrument panel.

Here, FIG. 13 is a diagram illustrating an example of a rule for determining the notification condition that is used by the notification condition changing unit 174. The notification condition changing unit 174 stores this rule as rule information, and determines the notification condition (notification timing, the output device, and the method thereof) corresponding to the state detected by the detection unit by referring to the rule information.

Items included in the rule information include, for example, "state of the vehicle occupant", "divergence degree", "notification timing", and "output device and method", and the like, but is not limited thereto.

The "state of the host vehicle occupant" is information indicating the state of the vehicle occupant detected by the detection unit. In the example of FIG. 13, examples of the "state of the vehicle occupant" includes a "state in which the vehicle occupant is awake and directed in the traveling direction and can perform a driving operation", "the vehicle occupant is awake and directed in the traveling direction and has touched the pedals, but released the hands from the steering wheel", "the vehicle occupant is awake and directed in the traveling direction, but is not touching the steering wheel or the pedals", "the vehicle occupant is awake and is directed in direction other than the traveling direction and does not touch the steering wheel and the pedals" and "the vehicle occupant has turned over in the seat and fallen asleep", but the state of the vehicle occupant is not limited thereto.

The "divergence degree" refers to a value of a level indicating a divergence degree between the state of the vehicle occupant detected by the detection unit and the state of the vehicle occupant according to a degree of automated driving. The state of the vehicle occupant according to the degree of automated driving is a state in which the periphery or a state of the host vehicle M can be monitored and is, for example, a state in which the vehicle occupant can confirm the left and the right or the rear of the host vehicle M while being directed in the traveling direction, and recognize the state of the travel route (for example, a road surface state, weather, or a state of a surrounding traveling vehicle). Further, a state in which the driving mode can rapidly transition from the automated driving mode to the manual driving mode can be included.

The "notification timing" is information indicating a timing at which the notification information is output. In FIG. 13, as the degree of divergence increases, the notification timing is set to be earlier (longer) in an order of N0 seconds before, N1 seconds before, N2 seconds before, N3 seconds before, and N4 seconds before. For example, at divergence level 1, the notification timing "N1 seconds before before" is set in consideration of time from a point in time of the display of the notification information on the display device 82 as the first step to the output of the sound from the speaker 83 as the second step, and time until the vehicle occupant grips the steering wheel 78, in addition to the time of the notification timing "N0 seconds before". Further, for example, at divergence level 3, the notification timing "N3 seconds before" is set in consideration of time from a point in time of the output of the notification information from the speaker 83 as the first step to the output of the notification information through the vibration of the seat by the seat driving device 89 as the second step, time until the vehicle occupant grips the steering wheel 78, and time until the vehicle occupant touches the pedal (the accelerator pedal 71 or the brake pedal 74), in addition to the time of the notification timing "N0 seconds before".

Further, at divergence level 1 and divergence level 2, the "output device and method" are both "display in the display device 82→sound output from the speaker 83" and are the same. However, the notification timing at divergence level 1 is set to "N1 seconds before", and the notification timing at divergence level 2 is set to "N2 seconds before" longer than N1 seconds before. This is set, for example, in consideration of time until the vehicle occupant touches the pedal (the accelerator pedal 71 or the brake pedal 74), in addition to time until the vehicle occupant grips the steering wheel 78. Accordingly, since time until the state of the vehicle occupant transitions to the state of the vehicle occupant according to the degree of automated driving can be ensured, it is possible to ensure preparation for switching of modes in automated driving.

Further, as another specific example, when the notification timing is before 10 seconds at a certain divergence level and when the divergence degree is higher than the above divergence level (the divergence level is high), any time of 10 seconds or more may be set as the notification timing. For example, the notification timing is before 20 seconds, or the like. According to the state of the vehicle occupant, the notification timing may be the same at a certain divergence level and the next higher divergence level even when the divergence degree increases.

Further, although other times are set to increase with reference to the time N0, time (later time) shorter than the reference time may be set when the divergence degree is lower than a reference divergence degree with reference to any other divergence degree and time, and time (previous time) longer than the reference time may be set when the divergence degree is higher than the reference divergence degree.

Here, the case in which the notification timing is a timing that is determined on the basis of time with reference to the time at which the notification information is output is illustrated in FIG. 13. However, when a timing that is determined with reference to a position at which notification information on a travel route from a current position of the host vehicle M to a destination is determined to be output is applied as the notification timing, a position in front (a position before arrival at a position determined as the notification timing) may be set as the notification timing with reference to the position determined as the notification timing.

The "output device and method" include, for example, information for designating which of a plurality of output devices is used or information for designating what notification is performed by the designated output device when the notification information is notified. For example, the "notification timing and method" that are "display in the display device 82→sound output from the speaker 83" indicate that a display is performed in the display device 82 in a first step, and sound is output from the speaker 83 in a second step. Further, for example, the "notification timing and method" that are "sound output from the speaker 83→vibration of the seat driving device 89→cold air from the air-conditioning device→open a window in the window driving device 91" indicate that sound is output from the speaker 83 in a first step, the seat 88 is vibrated by the seat driving device 89 in a second step, cool air is blown from the air conditioning device in a third step, and the window driving device 91 is driven to open at least one of the windows in the host vehicle in a fourth step. Here, in the "output device and method", some steps may be set. In this case, when the vehicle occupant is determined not to transition to a state of the vehicle occupant according to the degree of automated driving in a certain time after notification in the notification condition in a certain step (for example, a first step) is performed, notification in the notification condition in the next step (for example, a second step) is performed.

Each value of the rule information illustrated in FIG. 13 is not limited thereto. Further, when information on any one of the "notification timing" and the "output device and method" described above is determined in advance, only other information may be included as the notification condition in the rule information in this embodiment. Further, the "output device and method" may be divided into the "output device" and the "method". When information on any one of both is determined in advance, only the other information may be included.

For example, when a line-of-sight direction of the vehicle occupant P is a traveling direction of the host vehicle M (an arrow a illustrated in FIG. 12) as illustrated in FIG. 12 described above and it is determined to be a state in which a driving operation is possible, the notification condition changing unit 174 causes the notification information represented by, for example, characters, figures, animation, or the like to be displayed on a screen of the navigation device 50 or a screen of the display device 82 such as an instrument panel N0 seconds before from a point in time at which the mode is switched. When the vehicle occupant P is awake and is directed in the traveling direction, but is determined not to touch the steering wheel and the pedals (for example, both of the accelerator pedal 71 and the brake pedal 74), the notification condition changing unit 174 causes the notification information to be displayed on the screen of the navigation device 50 or the screen of the display device 82 such as an instrument panel N2 seconds before from a point in time at which the mode is switched, and then, outputs the notification information through sound from the speaker 83 (outputs the sound) when the state in which the vehicle occupant does not touch the steering wheel and the pedals is determined to continue for a predetermined time.

As described above, the HMI control unit 170 determines the notification condition for outputting the notification information to the vehicle occupant and notifies the notification condition according to the state of the host vehicle M, for example, before a predetermined time at which the driving mode transitions from the first mode described above to the second mode or the third mode or before the host vehicle M reaches a predetermined position on the travel route. Accordingly, the vehicle occupant is notified that the obligation regarding the driving transitions to the vehicle occupant in the notification condition at an appropriate timing according to the state of the vehicle occupant before the transition. Accordingly, a preparation period for switching of automated driving, which is a preparation period in which the state of the host vehicle M is considered can be provided for the vehicle occupant.

Figure 14:
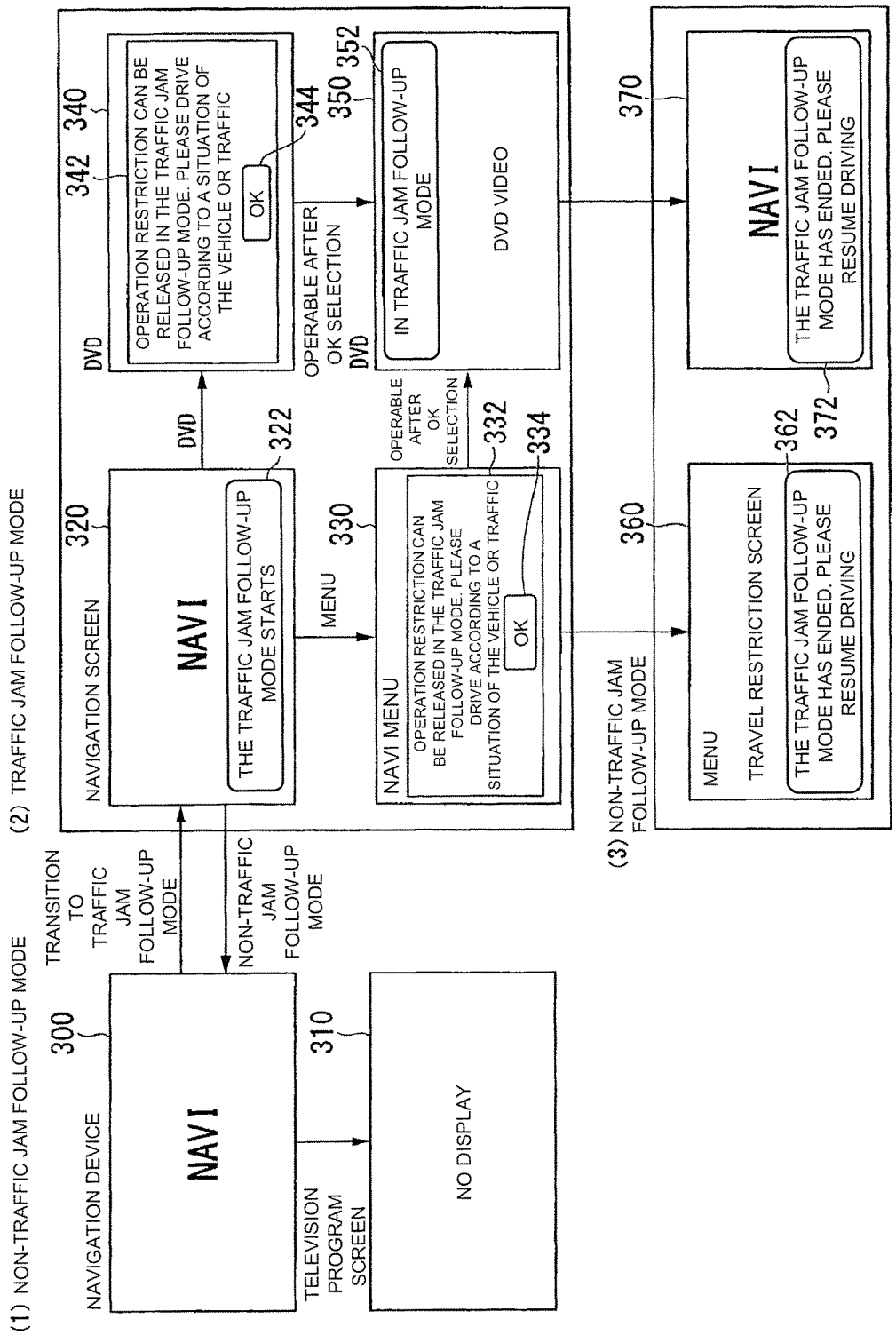
FIG. 14 is a diagram illustrating an information output example from an interface device.

FIG. 14 is a diagram illustrating an information output example from the interface device. In the example of FIG. 14, a case in which an example of the first mode described above is a traffic jam follow-up mode, and an example of the second mode described above is a non-traffic jam follow-up mode will be described.

In the example of FIG. 14, when the host vehicle M is not the traffic jam follow-up mode 14 (in the case of "(1) Non-traffic jam follow-up mode" illustrated in FIG. 14), since an obligation regarding driving is imposed to the vehicle occupant of the host vehicle M, and predetermined operations with respect to the interface device is limited. Accordingly, as illustrated in FIG. 14, a navigation screen 300 can be displayed, but a screen 310 that displays a television program is not displayed.

Here, as illustrated in FIG. 14, when a transition from the non-traffic jam follow-up mode to the traffic jam follow-up mode occurs (in the case of "(2) Traffic jam follow-up mode" illustrated in FIG. 14) by automated driving of the host vehicle M, a route guidance screen is displayed in the navigation screen 320, but in this case, a message screen 322 indicating that the traffic jam follow-up mode starts is displayed.

Further, when a transition from the navigation screen 320 to a menu screen 330 occurs, a message screen 332 such as "Operation restriction can be released in the traffic jam follow-up mode. Please drive according to a situation of the vehicle and traffic" is displayed, and an OK button 334 is displayed, making it possible to notify the vehicle occupant of attention calling. Content of the message is not limited thereto. When the HMI control unit 170 receives selection of the OK button 334 by the vehicle occupant, the HMI control unit 170 releases the operation restriction such that a transition to a DVD screen 340 can occur and the navigation device 50 or the like can be operated.

Further, similarly, even when a transition from the navigation screen 320 to the DVD screen 340 is made by a DVD operation, the message screen 342 and the OK button 344 described above are displayed, making it possible to notify the vehicle occupant of attention calling. When the HMI control unit 170 receives selection of the OK button 334 by the vehicle occupant, the HMI control unit 170 releases the operation restriction such that a transition to the DVD screen can occur and the navigation device 50 or the like can be operated.

Here, the HMI control unit 170 superimposes a message 352 indicating the traffic jam follow-up mode in a DVD video display screen 350 after a transition, making it possible for the vehicle occupant to view a DVD video with peace of mind. Further, the HMI control unit 170 acquires, for example, traffic information (traffic jam information) on a travel road from an external device using the communication device 55, calculates information (for example, a duration) indicating a time for which the traffic jam follow-up mode is continued from the acquired traffic information, and causes the calculated information to be displayed as a message 352. Accordingly, the vehicle occupant can recognize time for which the vehicle occupant is allowed to view a DVD video or the like and can view the image with peace of mind.

Further, when the obligation regarding driving of the host vehicle is generated due to the mode change from the traffic jam follow-up mode ("(3) Non-traffic jam follow-up mode" illustrated in FIG. 14), the menu screen 330 transitions to a travel restriction screen 360 to display a message 362 indicating that travel restriction is performed. An example of the message, a message "The traffic jam follow-up mode has ended. Please resume driving." is displayed at a time set according to the state (for example, driving intention) of the vehicle occupant, as illustrated in FIG. 14. Further, in the transition from the DVD video display screen 350, similarly, the navigation screen 370 is displayed and the same message 372 is displayed at a predetermined timing according to the state of the vehicle occupant. The messages 362 and 372 may be displayed for a predetermined time or may be displayed until the mode is switched. Further, content of the message is not limited to the above-described example. Further, for the respective messages illustrated in FIG. 14, sound may be output together with the screen display or only the sound may be output.

As illustrated in FIG. 14, the HMI control unit 170 changes presence or absence of output of predetermined information or an condition thereof on the basis of a use state of the interface device. Thus, the vehicle occupant can acquire appropriate information regarding switching of the driving mode from the interface device. The information output by the interface device described above makes it possible for the vehicle occupant to more reliably perform surrounding monitoring or the like before preparation for driving or a manual driving is performed, at a predetermined timing before actual switching.

<Processing Flow>

Hereinafter, a flow of a process of the vehicle control system 100 according to this embodiment will be described. In the following description, a flow of an HMI control process regarding notification to the vehicle occupant, which is mainly performed by the HMI control unit 170, among various processes in the vehicle control system 100 will be described.

[First Embodiment]

Figure 15:
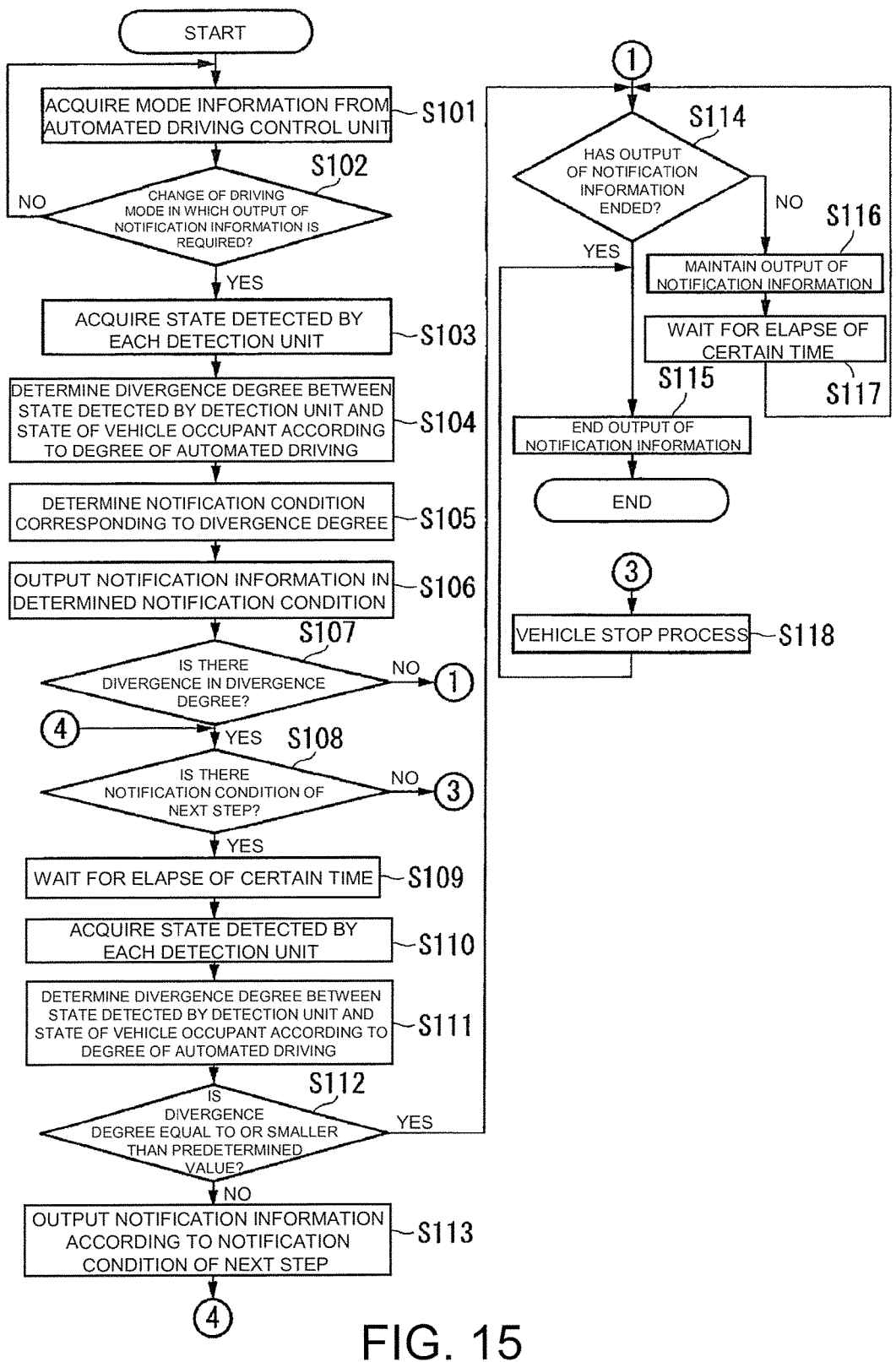
FIG. 15 is a flowchart illustrating an example of an HMI control process.

FIG. 15 is a flowchart illustrating a first embodiment of the HMI control process. In an example of FIG. 15, the HMI control unit 170 acquires the mode information from the automated driving control unit 120 (step S101), and determines whether or not the driving mode included in the acquired mode information is a change of the driving mode in which the output of the notification information is required due to being changed from a current driving mode (step S102). The change of the driving mode in which the output of the information is required includes, for example, a case in which the driving mode is changed from the first mode to any one of the second mode, the third mode, and the manual driving mode, a case in which the driving mode is changed from the second mode to the third mode or the manual driving mode, and a case in which the driving mode is changed from the third mode to the manual driving mode. When the driving mode is not the change of the driving mode in which the output of the information is required (step S102-NO), that is, a driving mode change for changing the driving mode to the side in which the degree of the obligation regarding the driving of the vehicle occupant decreases or the driving mode is not changed, the HMI control unit 170 proceeds to step S101 after a predetermined time, and acquires the mode information.

On the other hand, when the driving mode is the change of the driving mode in which the output of the information is required (step S102-YES), the notification condition changing unit 174 of the HMI control unit 170 acquires the detection result of each detection unit that has detected the state of the vehicle occupant from the detection result acquisition unit 171 (step S103). The notification condition changing unit 174, for example, acquires the state of the vehicle occupant detected by the in-vehicle camera 95, the angle detection sensor 88A, the load sensor 88B, the load sensor 88C, or the like. For example, the notification condition changing unit 174 determines whether or not the vehicle occupant is asleep and which direction the orientation of the face of the vehicle occupant is directed to, on the basis of the image obtained from the in-vehicle camera 95. When it is determined whether or not the vehicle occupant is asleep, the notification condition changing unit 174 specifies the eyes on the basis of a feature point obtained from the face image of the vehicle occupant, determines an opened or closed state of the eyes, determines that the vehicle occupant is awake when the eyes opens, and determines that the vehicle occupant is asleep when the eyes are closed. When the orientation of the face of the vehicle occupant is determined, the notification condition changing unit 174 estimates the face, and positions of face parts (for example, eyes, a nose, and a mouth) on the basis of the feature point obtained from the face image. The notification condition changing unit 174 collates a positional relationship between the face and the respective face parts with face angle data to determine the orientation of the face. Here, the face angle data is, for example, data in which a face model indicating the positional relationship between the face and the respective face parts is associated with an angle of the face. The notification condition changing unit 174 specifies the face model corresponding to the positional relationship between the estimated face and the respective face parts and obtains the angle of the face according to the specified face model to determine the angle of the face.

Further, the notification condition changing unit 174 determines whether or not the vehicle occupant grips the steering wheel 78. Further, the notification condition changing unit 174 determines whether or not the vehicle occupant touches any one of accelerator pedal 71 and the brake pedal 74 with a foot.

Further, the notification condition changing unit 174 determines which of directions of frontward, rightward, leftward, and backward the posture of the vehicle occupant is directed to, on the basis of the load distributions obtained from the load sensor 88B and the load sensor 88C.

The notification condition changing unit 174 determines the state of the vehicle occupant on the basis of the determination result. For example, the notification condition changing unit 174 determines the state of the vehicle occupant on the basis of whether the vehicle occupant is asleep or awake, an orientation of the face of the vehicle occupant, whether or not the vehicle occupant grips the steering wheel 78, whether or not the vehicle occupant touches any one of the pedals, or an orientation of a posture of the vehicle occupant.

The notification condition changing unit 174 determines the determined state of the vehicle occupant corresponds to any one of the "states of the vehicle occupant" determined in the rule information, determines the divergence degree according to the corresponding "the state of the vehicle occupant" (step S104), and determines the notification condition from the specified divergence degree (step S105).

For example, in the notification condition changing unit 174, when it is determined that the vehicle occupant is awake, the face of the vehicle occupant is directed to the front of the vehicle, the vehicle occupant grips the steering wheel 78, and the vehicle occupant touches the accelerator pedal 71 or the brake pedal 74 as the obtained state of the vehicle occupant, the state of the vehicle occupant is determined to be a "State in which the vehicle occupant is awake and is directed in a traveling direction, and a driving operation is possible", and the divergence degree is determined to be "No divergence". In this case, as the notification condition, the notification timing is determined to be "N0 seconds before", and the output device and method are determined to be "Displayed on the display device 82".

Further, for example, when the vehicle occupant is awake, the face of the vehicle occupant is directed in a direction other than the front of the vehicle, and the vehicle occupant releases the hands from the steering wheel 78, and the vehicle occupant does not touch both the accelerator pedal 71 and the brake pedal 74 as the obtained state of the vehicle occupant, it is determined that the state of the vehicle occupant is that "the vehicle occupant is awake and is directed in direction other than the traveling direction and does not touch the steering wheel and the pedals", and the divergence degree is determined to be "divergence level 3". In this case, as the notification condition, the notification timing is determined to be "N3 seconds before", and the output device and method are determined to be "Sound output from the speaker 83→vibration of the seat driving device 89".

The notification condition changing unit 174 causes the notification information to be output to the output device according to the determined notification condition (step S106). For example, when the notification timing is determined to be "N0 seconds before" and the output device and method are determined to be "Displayed on the display device 82" as the notification condition, the notification condition changing unit 174 outputs an instruction according to the notification condition to the output device control unit 176, causing the driving mode being switched from the first mode to the second mode to be displayed on the display screen of the display device 82 at a point in time at which N0 seconds before is reached from the notified reference timing. The vehicle occupant can view the notification information displayed on the display screen of the display device 82. Accordingly, the vehicle control system 100 can cause the vehicle occupant to be aware that the driving mode is changed so that obligation regarding the driving of the vehicle occupant of the host vehicle increases, and can provide a preparation period for mode switching in automated driving for the vehicle occupant.

Further, for example, when the notification timing is "N3 seconds before" and the output device and method are determined to be "sound output from the speaker 83→vibration of the seat driving device 89" as a notification condition, the notification condition changing unit 174 outputs an instruction according to the notification condition to the output device control unit 176, causing, for example, sound indicating that the driving mode is switched from the first mode to the second mode to be output from the speaker 83 at a point in time before the N3 seconds from the reference timing for notification. Here, for example, when the posture of the vehicle occupant is determined to be backward with respect to the traveling direction, the notification information is output through sound from the speaker 83 installed in a direction (in this case, the front side in the traveling direction) opposite to a direction in which the vehicle occupant is directed. In this case, in the HMI control unit 170, since sound is output from the rear side of the vehicle occupant (the front side in the traveling direction of the host vehicle M), the vehicle occupant can be caused to be aware that what has happened behind the vehicle occupant and a body of the vehicle occupant can be caused to be directed to the sound source (the speaker 83 on the front side).

Then, the notification condition changing unit 174 determines whether or not there is a divergence on the basis of the divergence degree determined in step S104 (step S107). For example, when the divergence degree is other than "No divergence", the notification condition changing unit 174 determines "There is a divergence" (step S107-YES) and proceeds to step S108. On the other hand, when the divergence degree is "No divergence" (step S107-NO), the notification condition changing unit 174 proceeds to step S114.

In step S114, the notification condition changing unit 174 determines whether or not the output of the notification information has ended (step S114). For example, when the predetermined time has elapsed after the output of the notification information starts or when the host vehicle M reaches a predetermined place as a point in time at which the output of the notification information ends, the output of the notification information ends. When it is determined that the output of the notification information has ended (step S114-YES), the notification condition changing unit 174 outputs an instruction to stop the output of the notification information to the output device control unit 176, to stop the output of the notification information from the output device (step S115). The HMI control unit 170 ends this flowchart.

On the other hand, in step S114, when it is determined that the output of the notification information does not end (step S114-NO), the output of the notification information continues (step S116). After waiting for a predetermined time (step S117), the notification condition changing unit 174 proceeds to step S114 in which it is determined again whether or not the output of the notification information has ended (step S114).

Then, in step S107, when it is determined that the divergence degree is "No divergence" (step S107-YES), the notification condition changing unit 174 determines whether or not there is a notification condition of a next step that has not yet been executed (step S108). For example, when the notification condition in which the notification timing is "N3 seconds before", the output device and method are determined to be "Sound output from the speaker 83→vibration of the seat driving device 89", and the sound is output from the speaker 83 is executed as the notification condition, the notification condition in which the notification information is output through "Vibration of the seat driving device 89" is not executed. Thus, it is determined that there is a next notification condition. When both of the notification condition in which the sound is output from the speaker 83 and the notification condition in which the seat is vibrated by the seat driving device 89 are executed, all the notification conditions are executed and there is no notification condition that has not yet been executed. Thus, it is determined that there is no next notification condition.

When there is a next step that has not yet been executed (step S108-YES), the notification condition changing unit 174 proceeds to step S109. On the other hand, when there is no next step that has not yet been executed (when all steps have been executed) (step S108-NO), the state of the vehicle occupant cannot become "No divergence" even when the notification condition is executed in all steps. Thus, the vehicle control system 100 executes a process of stopping the host vehicle at a safe place in automated driving (step S118), and ends the output of the notification information (step S115).

On the other hand, in step S108, when there is a next step that is not executed (step S108-YES), the notification condition changing unit 174 waits for elapse of a certain time (step S109), and acquires the detection result of each detection unit that has detected the state of the vehicle occupant from the detection result acquisition unit 171 again (step S110). The notification condition changing unit 174 performs a determination as to a divergence degree between the state of the vehicle occupant based on the acquired detection result and the state of the vehicle occupant according to the degree of automated driving (step S111). The notification condition changing unit 174 determines whether the divergence degree that is the determination result is equal to or smaller than a predetermined value (step S112). It is determined whether the divergence degree is equal to or smaller than a predetermined value, for example, on the basis of whether the divergence degree is "no divergence". When the divergence degree is not equal to or smaller than the predetermined value, that is, when the divergence degree is not "No divergence" (step S112-NO), the notification condition changing unit 174 outputs the notification information according to the notification condition of the next step (step S113).

For example, when the state of the vehicle occupant that has been acquired again is not "No divergence" and the notification condition in which the notification timing is determined to be "N3 seconds before", the output device and method are determined to be "sound output from the speaker 83→vibration of the seat driving device 89", and sound is output from the speaker 83 is executed as the notification condition, the notification condition changing unit 174 outputs an instruction according to the notification condition of the "vibration of the seat driving device 89" to the output device control unit 176, thereby causing the seat to be vibrated by the seat driving device 89. For example, the seat driving device 89 vibrates the seat 88 in a vibration pattern in which a vibration state and a vibration stop state are repeated at short time intervals. Thus, the vehicle occupant can recognize that the driving mode is switched since the seat 88 is vibrated by the seat driving device 89 in the next step even when the vehicle occupant cannot correctly hear the notification information of the sound output from the speaker 83 and cannot immediately prepare for switching between the modes in the automated driving. Accordingly, it is possible to cause the vehicle occupant to recognize that the driving mode is changed to the side in which the obligation regarding driving increases, and to provide the preparation period for switching between the modes in the automated driving for the vehicle occupant since the seat 88 can be vibrated by the seat driving device 89 in the next step (the second step) even when the vehicle occupant cannot prepare the switching between modes in the automated driving even though the vehicle control system 100 outputs the sound from the speaker 83 to the vehicle occupant. Further, since the notification information is output through sound in the first step, and then, the notification information can be output through vibration in the second step, it is possible to cause the notification information to be recognized through a tactual sense of the vehicle occupant by performing notification through the vibration even in a situation in which it is difficult to recognize the notification information through a hearing sense of the vehicle occupant (for example, a situation in which the vehicle occupant is directed to the rear with respect to the traveling direction and is loudly talking with another vehicle occupant in the host vehicle). Further, in this case, since the divergence degree is "divergence level 3" higher than "divergence level 2", and the output of the notification information is started at the notification timing of "N3 seconds before" of which the time is longer than "N2 seconds before", it is possible to ensure a period in which preparation for switching between modes in the automated driving in consideration of time taken for the vehicle occupant to change the posture so that the vehicle occupant is directed to the front with respect to the traveling direction is performed even when the first step and the second step are performed.

Further, for example, when the state of the inside of the vehicle is "the vehicle occupant turns over the seat and fallen asleep", the divergence level is determined to be 4, and the state of the vehicle occupant acquired again is determined not to be "No divergence", and when "sound output from the speaker 83" in the first the step and "vibration of the seat driving device 89" in the second step among "sound output from the speaker 83→vibration of the seat driving device 89→cold air from the air-conditioning device→open a window in the window driving device 91" are executed as the notification condition in the output device and method, the notification condition changing unit 174 outputs an instruction according to the notification condition of "cool wind from the air conditioning device" to the output device control unit 176 to cause the air-conditioning device to perform a cooling operation, and sends the cold air from the blowing-out port 97 to output the notification information. In this case, the air-conditioning device blows while lowering the set temperature stepwise so that a room temperature is lowered from a current room temperature. Accordingly, even when the sound output from the speaker 83 or the vibration of the seat 88 by the seat driving device 89 is performed, the HMI control unit 170 blows cold air from the air-conditioning device as a notification condition different from the sound or the vibration, to output the notification information when the state of the vehicle occupant does not reach the state of the vehicle occupant according to the degree of automated driving, such as a state in which the vehicle occupant does not wake up. Thus, the vehicle occupant can feel his or her sensory temperature that is lowered due to blown cool wind in the third step of the notification condition and recognize that the driving mode is switched even when the vehicle occupant fails to recognize the notification information through the sound or the vibration. Accordingly, it is possible to cause the vehicle occupant to recognize that the driving mode is changed to the side in which the obligation regarding driving increases, and to provide the preparation period for switching between the modes in the automated driving for the vehicle occupant since the cold air can be blown in the next step even when the vehicle occupant cannot prepare the switching between modes in the automated driving even though the vehicle control system 100 outputs the notification information through the sound or the vibration to the vehicle occupant. Further, it is possible to cause the vehicle occupant to recognize the notification information through a temperature change by lowering an ambient temperature in a situation in which it is difficult for the vehicle occupant to recognize the notification information through the sound or the vibration (for example, a situation in which the vehicle occupant does not wake up through the sound or the vibration). Further, in this case, since the divergence degree is "divergence level 4" higher than "divergence level 3", and the output of the notification information is started at the notification timing of "N4 seconds before" of which the time is longer than "N3 seconds before", it is possible to ensure a period in which preparation for switching between modes is performed in the automated driving because the notification information is output in a stepwise according to a notification timing in consideration of time until the air conditioning device can operate to blow cold air brought down to a predetermined temperature or time taken for the vehicle occupant to change the posture so that the vehicle occupant is directed to the front with respect to the traveling direction.

Further, when the vehicle occupant does not wake up within a predetermined time even when the cold air is blown, the HMI control unit 170 drives the window driving device 91 to open at least one of windows provided in the host vehicle in order to output the notification information. Accordingly, external air is taken into the host vehicle M, making it possible to greatly change a flow of air in the host vehicle and to increase wind noise in the host vehicle. Thus, another stimulus is applied to a vehicle occupant that does not wake up by means of the sound from the speaker 83, the vibration, or the change in temperature in the vehicle to wake the vehicle occupant up, making it possible to prepare for switching of the mode in the automated driving.

If the notification condition changing unit 174 performs the output of the notification information, the process proceeds to the step S108 in which it is determined whether there is a notification condition of the next step that has not yet been executed (step S108).

On the other hand, when the divergence degree is equal to or lower than a predetermined value, that is, when the divergence degree reaches "No divergence" (step S112-YES), the notification condition changing unit 174 proceeds to the step S114 in which the notification condition changing unit 174 determines whether or not the output of the notification information has ended (step S114).

The present invention is not limited to the examples of the output device and method in the embodiment described above. Other output devices can be used and other notification method can be used. For example, the HMI control unit 170 may also cause a pretensioner to be driven. In this case, in the notification method, for example, the pretensioner can be driven so that pulling and releasing of a seatbelt is repeated at short time intervals. For example, even when a cushion is laid on the seat 88 and it is difficult to transfer vibration through the seat 88, the vibration is applied to the vehicle occupant, making it possible to recognize the notification information.

Further, when the vehicle occupant is determined to wear a headphone on the basis of the image obtained from the in-vehicle camera 95, sound output may not always effective even when the speaker 83 outputs the sound. In this case, the notification condition changing unit 174 may determine the notification condition so that the output device or the notification method other than a notification condition based on sound is used.

Further, when volume of the content reproduction device 85 is detected to be greater than a predetermined reference value as the state of the vehicle occupant, the notification condition changing unit 174 may determine the notification condition so that the volume of the content reproduction device 85 is lowered to predetermined volume and sound is output from the speaker 83. Thus, it is possible to prevent the sound output from speaker 83 from being difficult to be heard due to the sound of the content reproduction device 85.

Further, when luminance of an illumination device provided in the host vehicle is detected to be higher than predetermined luminance as the state of the vehicle occupant, the notification condition may be determined so that the luminance of the illumination device is lowered to the predetermined luminance and the display screen of the display device 82 is displayed. Thus, it is possible to prevent the display screen of the display device 82 from being difficult to be viewed due to brightness of the illumination device.

Although a case in which the notification information is information indicating that the driving mode is changed to a side in which the obligation regarding driving of the vehicle occupant of the host vehicle increases has been described in the above-described embodiments, other information such as a current state notification of an host vehicle M may be used. For example, when it is detected that the host vehicle M is likely to collide as the state of the vehicle, the HMI control unit 170 may perform notification by causing the angle of the backrest portion or the position in a front-back direction of the seat portion of the seat 88 to return to a determined position, as the notification information.

The HMI control process illustrated in FIG. 15 described above may be executed when the mode information is acquired from the automated driving control unit or may be executed at constant time intervals. As an embodiment, some or all of the above-described embodiments may be combined.

Modes for carrying out the present invention have been described with reference to the embodiments, but the present invention is not limited to the embodiments, and various modifications and substitutions can be added within the scope not departing from the gist of the present invention.

What is claimed is:

1. A vehicle control system, comprising:
a hardware processor configured to control:
an automated driving control unit that automatically controls at least one of acceleration/deceleration and steering of a host vehicle, the automated driving control unit performing automated driving control in any one of a plurality of modes having different degrees of automated driving;
a detection unit that detects a state of an occupant in the host vehicle;
an output unit that outputs notification information on the automated driving control; and
a notification condition changing unit that changes a notification condition for outputting the notification information according to the state of the occupant detected by the detection unit,
wherein the notification condition changing unit further changes a timing at which the notification information is output and further changes the timing on the basis of a degree of divergence between the state of the occupant detected by the detection unit and the state of the occupant according to the degree by which automated driving is to transition.

2. The vehicle control system according to claim 1, wherein the notification information is notification information according to a transition of a degree of automated driving.

3. The vehicle control system according to claim 2, wherein the notification condition changing unit changes a timing at which the notification information is output.

4. The vehicle control system according to claim 3, wherein the notification condition changing unit changes the timing on the basis of a degree of divergence between the state of the occupant detected by the detection unit and the state of the occupant according to the degree by which automated driving is to transition.

5. The vehicle control system according to claim 1, wherein the notification condition changing unit changes the timing to output the notification information before a reference timing when the degree of divergence is greater than a predetermined value, and changes the timing to output the notification information after the reference timing when the degree of divergence is smaller than the predetermined value.

6. The vehicle control system according to claim 4, wherein the notification condition changing unit changes the timing to output the notification information before a reference timing when the degree of divergence is greater than a predetermined value, and changes the timing to output the notification information after the reference timing when the degree of divergence is smaller than the predetermined value.

7. The vehicle control system according to claim 1, wherein the output unit includes a plurality of different output devices, and
the notification condition changing unit changes an output device that outputs the notification information according to a state of an occupant detected by the detection unit.

8. The vehicle control system according to claim 2, wherein the output unit includes a plurality of different output devices, and the notification condition changing unit changes an output device that outputs the notification information according to a state of an occupant detected by the detection unit.

9. The vehicle control system according to claim 8, wherein the notification condition changing unit selects a display device as an output target device when the state is determined to be a state in which the occupant is able to view display content of the display device among the plurality of output devices, and selects an output device other than the display device as the output target device when the state is determined not to be a state in which the occupant is able to view the display content.

10. The vehicle control system according to claim 7, wherein the notification condition changing unit changes the output device that outputs the notification information on the basis of the state of the occupant detected by the detection unit, which is obtained after the notification information is output from the output device.

11. The vehicle control system according to claim 8, wherein the notification condition changing unit changes the output device that outputs the notification information on the basis of the state of the occupant detected by the detection unit, which is obtained after the notification information is output from the output device.

12. A vehicle control method, comprising:
performing, by a vehicle-mounted computer, automated driving control of automatically controlling at least one of acceleration/deceleration and steering of a host vehicle, the automated driving control being performed in any one of a plurality of modes having different degrees of automated driving;
detecting, by a vehicle-mounted computer, a state of an occupant in the host vehicle;
changing, by a vehicle-mounted computer, a notification condition for outputting notification information on the automated driving control according to the detected state of the occupant, and outputting the notification information;
changing, by a vehicle-mounted computer, the notification condition changes a timing at which the notification information is output; and
changing, by a vehicle-mounted computer, the notification condition further changes the timing on the basis of a degree of divergence between the detected state of the occupant, and detected state of the occupant according to the degree by which automated driving is to transition.

13. A vehicle control program product comprising a computer usable medium having control logic stored therein for causing a vehicle-mounted computer to execute:
performing automated driving control of automatically controlling, at least one of acceleration/deceleration and steering of a host vehicle, the automated driving control being performed in any one of a plurality of modes having different degrees of automated driving;
detecting a state of an occupant in the host vehicle;
changing a notification condition for outputting notification information on the automated driving control according to the detected state of the occupant, and outputting the notification information using an output device;
changing the notification condition timing at which the notification information is output; and
changing the notification condition timing on the basis of a degree of divergence between the detected state of the occupant, and detected state of the occupant according to the degree by which automated driving is to transition.

14. A vehicle control system, comprising:
a hardware processor configured to control:
an automated driving control unit that automatically controls at least one of acceleration/deceleration and steering of a host vehicle, the automated driving control unit performing automated driving control in any one of a plurality of modes having different degrees of automated driving;
a detection unit that detects a state of an occupant in the host vehicle;
an output unit that outputs notification information on the automated driving control; and
a notification condition changing unit that changes a notification condition for outputting the notification information according to the state of the occupant detected by the detection unit,
wherein the output unit includes a plurality of different output devices, and
the notification condition changing unit further changes an output device that outputs the notification information according to a state of an occupant detected by the detection unit,
wherein the notification condition changing unit selects a display device as an output target device when the state is determined to be a state in which the occupant is able to view display content of the display device among the plurality of output devices, and selects an output device other than the display device as the output target device when the state is determined not to be a state in which the occupant is able to view the display content.

* * * * *